US012030722B2

(12) United States Patent
Matsumoto

(10) Patent No.: US 12,030,722 B2
(45) Date of Patent: Jul. 9, 2024

(54) TRAVERSER, BASE UNIT, AND MOVING UNIT

(71) Applicant: HIRATA CORPORATION, Kumamoto (JP)

(72) Inventor: Bungo Matsumoto, Kumamoto (JP)

(73) Assignee: HIRATA CORPORATION, Kumamoto (JP)

( * ) Notice: Subject to any disclaimer, the term of this patent is extended or adjusted under 35 U.S.C. 154(b) by 218 days.

(21) Appl. No.: 17/729,349

(22) Filed: Apr. 26, 2022

(65) Prior Publication Data

US 2022/0250847 A1 Aug. 11, 2022

Related U.S. Application Data

(63) Continuation of application No. PCT/JP2020/038343, filed on Oct. 9, 2020.

(30) Foreign Application Priority Data

Nov. 1, 2019 (JP) .................. 2019-200206

(51) Int. Cl.
*B65G 13/07* (2006.01)
*B61B 13/00* (2006.01)
(Continued)

(52) U.S. Cl.
CPC ............. *B65G 13/07* (2013.01); *B65G 43/04* (2013.01); *B65G 47/643* (2013.01); *B65G 2203/0291* (2013.01)

(58) Field of Classification Search
CPC ........ B65G 13/07; B65G 43/04; B65G 47/52; B65G 47/54; B65G 47/64; B61B 13/00
(Continued)

(56) References Cited

U.S. PATENT DOCUMENTS 9,809,308 B2 * 11/2017 Aguilar ................... B61B 13/00
10,351,353 B1 * 7/2019 Skarlupka .............. B65G 47/54
(Continued)

FOREIGN PATENT DOCUMENTS

CN 102272021 A 12/2011
CN 103231888 A 8/2013
(Continued)

OTHER PUBLICATIONS

International Search Report (PCT/ISA/210) with translation and Written Opinion (PCT/ISA/237) mailed on Dec. 22, 2020, by the Japan Patent Office as the International Searching Authority for International Application No. PCT/JP2020/038343. (11 pages).
(Continued)

*Primary Examiner* — Douglas A Hess
(74) *Attorney, Agent, or Firm* — BUCHANAN INGERSOLL & ROONEY PC

(57) ABSTRACT

A traverser includes a base unit including a rail member, a moving unit configured to reciprocally move on the rail member between a first position and a second position, and a conveyance unit mounted on the moving unit and configured to convey a conveyance target object. The moving unit include a first travel roller that is a drive roller, and a drive mechanism configured to give a rotation driving force to the first travel roller. The drive mechanism includes a travel motor configured to supply the rotation driving force, and a friction transmission mechanism configured to transmit the rotation driving force of the travel motor to the first travel roller by a friction force.

24 Claims, 18 Drawing Sheets

(51) Int. Cl.
  *B65G 43/04* (2006.01)
  *B65G 47/54* (2006.01)
  *B65G 47/57* (2006.01)
  *B65G 47/64* (2006.01)
(58) Field of Classification Search
  USPC .......................................................... 198/789
  See application file for complete search history.

(56) References Cited

U.S. PATENT DOCUMENTS

| | | | |
|---|---|---|---|
| 10,882,703 B2 * | 1/2021 | Phillips | .................. B65G 43/08 |
| 11,008,169 B2 * | 5/2021 | Dudek | .................. B65G 13/071 |
| 11,117,752 B2 * | 9/2021 | Foster | ..................... B61B 13/12 |
| 11,439,921 B2 * | 9/2022 | McVeen | .................. B61B 13/00 |
| 2011/0253508 A1 | 10/2011 | Tsugawa | |
| 2012/0285797 A1 | 11/2012 | Ooe | |
| 2015/0203298 A1 | 7/2015 | Matsumoto | |

FOREIGN PATENT DOCUMENTS

| | | |
|---|---|---|
| CN | 203127595 U | 8/2013 |
| CN | 104684823 A | 6/2015 |
| CN | 105564906 A | 5/2016 |
| CN | 207604451 U | 7/2018 |
| CN | 109625819 A | 4/2019 |
| JP | H04107163 U | 9/1992 |
| JP | H0665330 U | 9/1994 |
| JP | H10157843 A | 6/1998 |
| JP | 2000168548 A | 6/2000 |
| JP | 2007269431 A | 10/2007 |
| JP | 4625782 B2 | 2/2011 |
| JP | 2011195336 A | 10/2011 |
| WO | 2011118246 A1 | 9/2011 |

OTHER PUBLICATIONS

Office Action dated Nov. 28, 2022, issued in corresponding European Patent Application No. 20883125.5. (11 pages).
Office Action/Search Report issued on May 12, 2023, in corresponding Chinese Patent Application No. 202080075823.4 and English translation of the Office Action/Search Report. (30 pages).

* cited by examiner

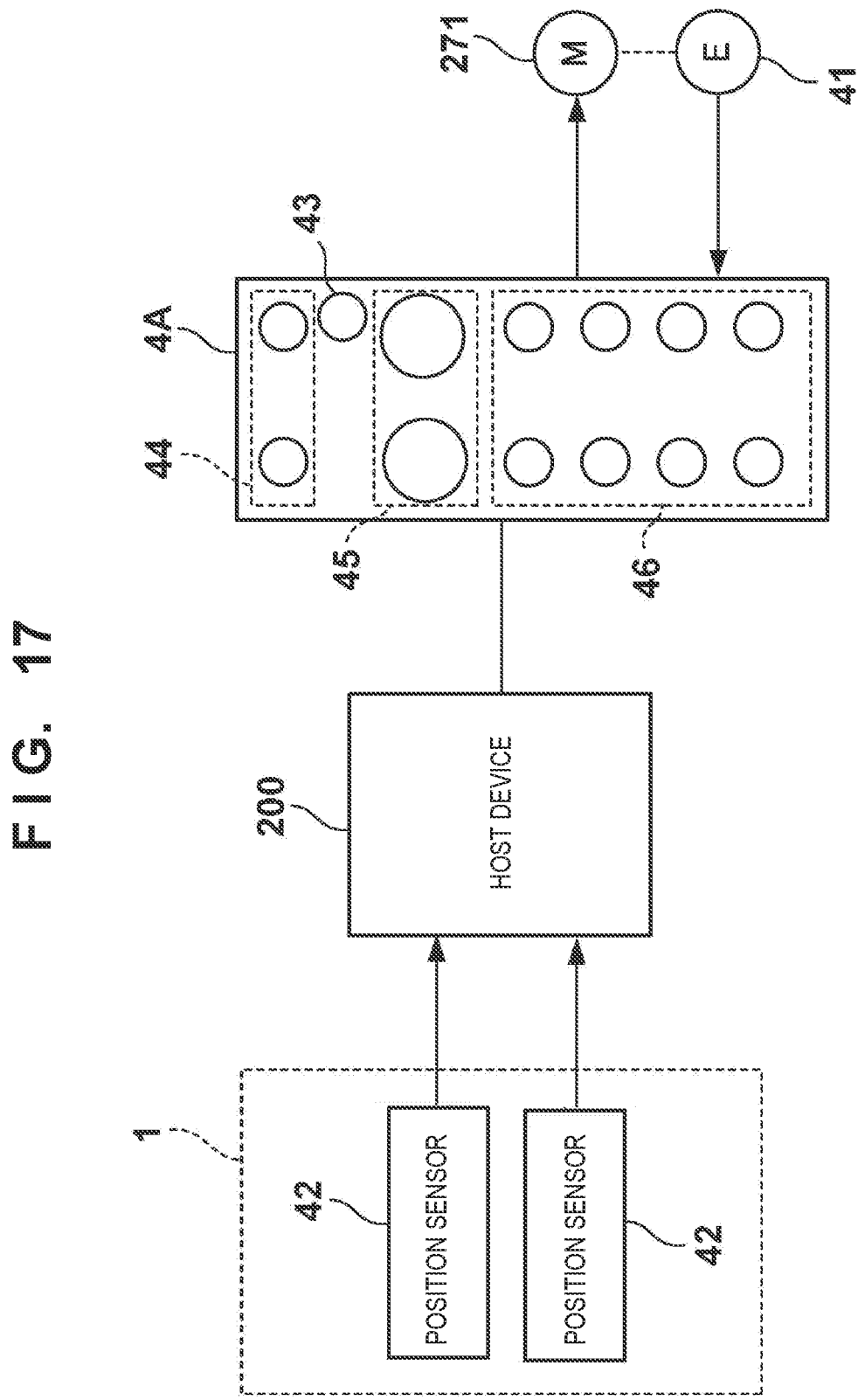

TRAVERSER, BASE UNIT, AND MOVING UNIT

CROSS-REFERENCE TO RELATED APPLICATION(S)

This application is a Continuation of International Patent Application No. PCT/JP2020/038343, filed Oct. 9, 2020, which claims the benefit of Japanese Patent Application No. 2019-200206, filed Nov. 1, 2019, both of which are hereby incorporated by reference herein in their entirety.

BACKGROUND OF THE INVENTION

Field of the Invention

The present invention relates to a traverser.

Description of the Related Art

There is known a traverser that includes a conveyor on a mobile carriage and transfers a work between two points (for example, Japanese Patent No. 4625782). This traverser moves between two points including the downstream end of the conveyor located at one end portion of a moving path through which the mobile carriage moves and the upstream end of the conveyor located at the other end portion of the moving path and transfers a work.

If an operator or a foreign substance exists on the reciprocal moving path of the traverser, interference with the traverser may occur. At this time, the movement of the traverser may be impeded, and accordingly, an overload may act on the driving system of the traverser, resulting in damage to the traverser or the work. Hence, if such interference occurs, particularly, if contact with the operator occurs, the traverser is required to safely stop without auxiliary equipment as a sensor such as a safety fence or a light curtain.

SUMMARY OF THE INVENTION

It is an object of the present invention to provide a traverser capable of safely stopping without auxiliary equipment at the time of overload action.

According to an aspect of the present invention, there is provided a traverser comprising: a base unit including a rail member; a moving unit configured to reciprocally move on the rail member between a first position and a second position; and a conveyance unit mounted on the moving unit and configured to convey a conveyance target object, wherein the moving unit comprises: a first travel roller that is a drive roller; and a drive mechanism configured to give a rotation driving force to the first travel roller, and the drive mechanism includes: a travel motor configured to supply the rotation driving force; and a friction transmission mechanism configured to transmit the rotation driving force of the travel motor to the first travel roller by a friction force.

Further features of the present invention will become apparent from the following description of exemplary embodiments (with reference to the attached drawings).

BRIEF DESCRIPTION OF THE DRAWINGS

FIG. 17 is a block diagram of a control system in the example shown in FIG. 16.

DESCRIPTION OF THE EMBODIMENTS

Figure 1A:
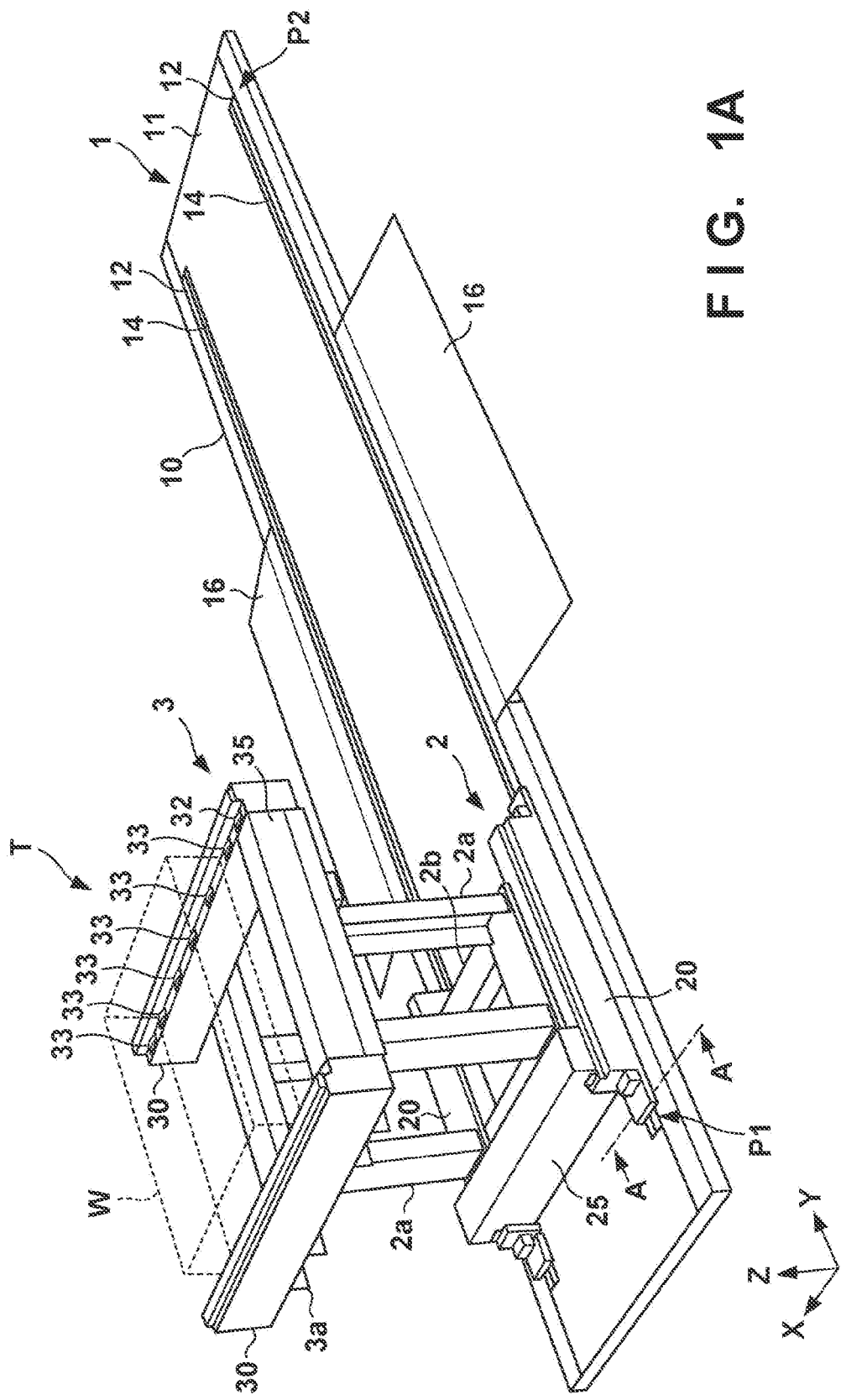
FIG. 1A is a perspective view of a traverser according to an embodiment.

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

<Outline>

FIG. 1A is a perspective view of a traverser 100 according to an embodiment of the present invention. In the drawings, an arrow X and an arrow Y indicate horizontal directions orthogonal to each other, and an arrow Z indicates a vertical direction to an X-Y plane. The traverser 100 includes a base unit 1, a moving unit 2, and a conveyance unit 3. The moving unit 2 and the conveyance unit 3 constitute a traverser main body T. The base unit 1 is extended in the Y direction and includes a travel path (rail member 12) for the traverser main body T (moving unit 2). The moving unit 2 is a travel unit that reciprocally moves on the travel path of the base unit 1, and is stopped at stop positions P1 and P2 located at the two end portions of the travel path. FIG. 1 shows a state in which the moving unit 2 is located at the stop position P1. The conveyance unit 3 is mounted on the moving unit 2 via a plurality of columns 2a, and loads/unloads a conveyance target object W. In this embodiment, the conveyance unit 3 is a roller conveyor including conveyance rollers 32 and 33.

Figure 1B:
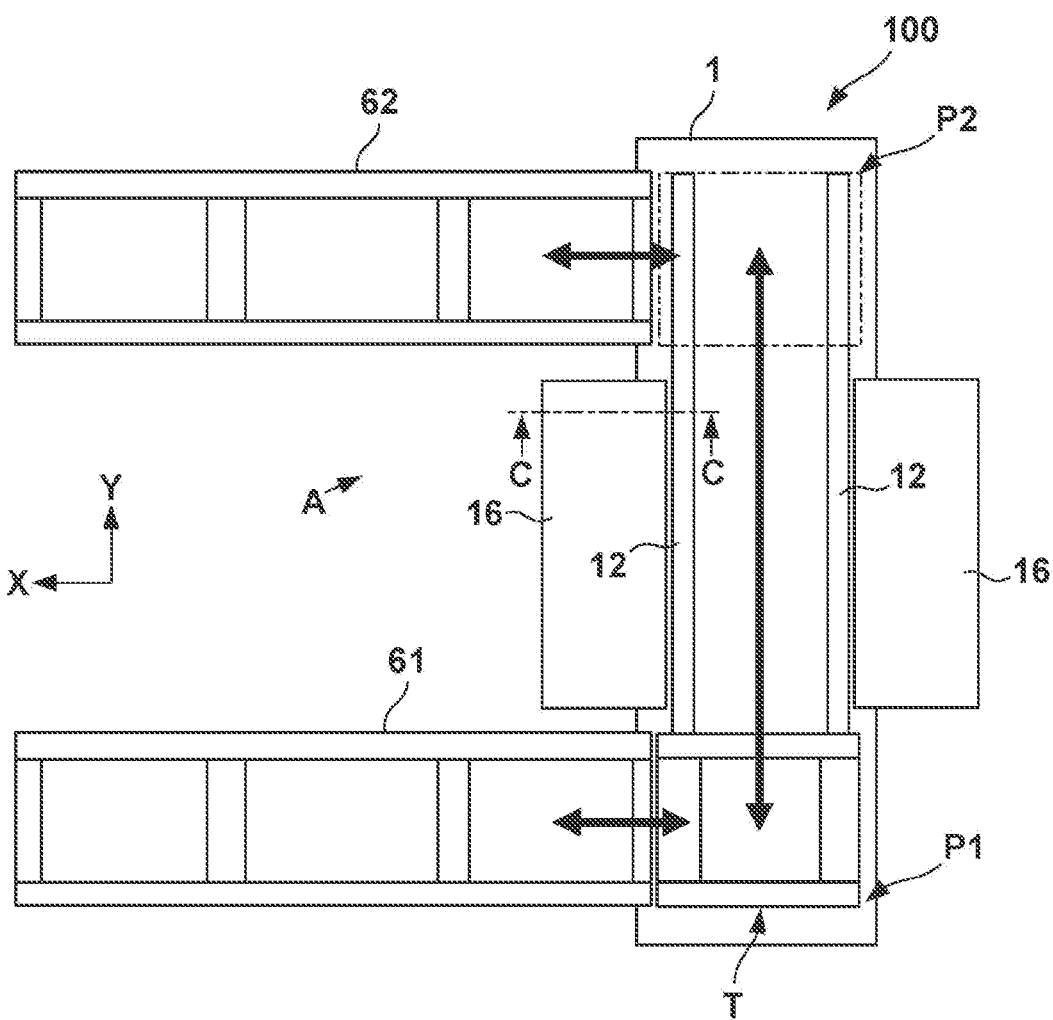
FIG. 1B is a schematic plan view showing the use mode of the traverser according to the embodiment.

For example, as shown in FIG. 1B, the traverser 100 is used to transfer the conveyance target object W between conveyors 61 and 62. More specifically, the stop positions P1 and P2 of the moving unit 2 are provided in correspondence with the positions of the conveyors 61 and 62. When the moving unit 2 stops at the stop position P1, the conveyor unit (to be described later) of the conveyance unit 3 faces the unload end (downstream end) of one conveyor 61. In this state, delivery (transfer) of the conveyance target object W from the one conveyor 61 to the conveyance unit 3 is performed. The traverser main body T to which the conveyance target object W is transferred moves along the travel path and stops at the stop position P2. At this time, the conveyor unit of the conveyance unit 3 faces the load end (upstream end) of the other conveyor 62. In this state, delivery of the conveyance target object W from the conveyance unit 3 to the other conveyor 62 is performed. Note that in this embodiment, the conveyance unit 3 conveys the conveyance target object W in the X direction. However, the conveyance target object W may be conveyed in a horizontal direction crossing the X direction. For example, the traverser main body T (moving unit 2) may be provided with a turn unit configured to change the direction of the conveyance target object W such that conveyance unit 3 can rotate about the Z-axis. This can change the conveyance direction of the conveyance unit 3 in accordance with the tilt of the conveyance direction of the conveyors 61 and 62 with respect to the travel path.

<Base Unit>

Figure 2:
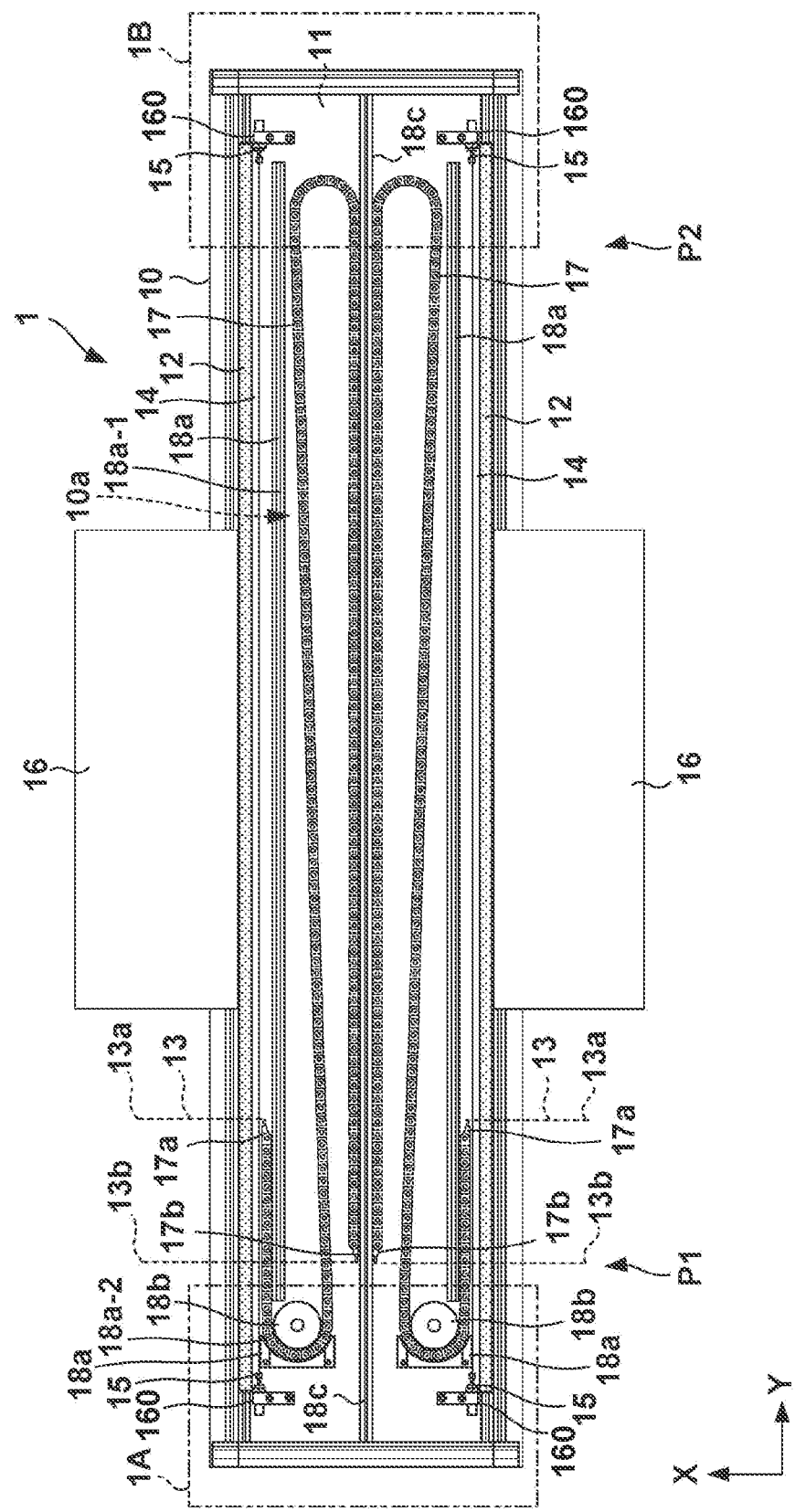
FIG. 2 is a plan view of a base unit.
Figure 3:
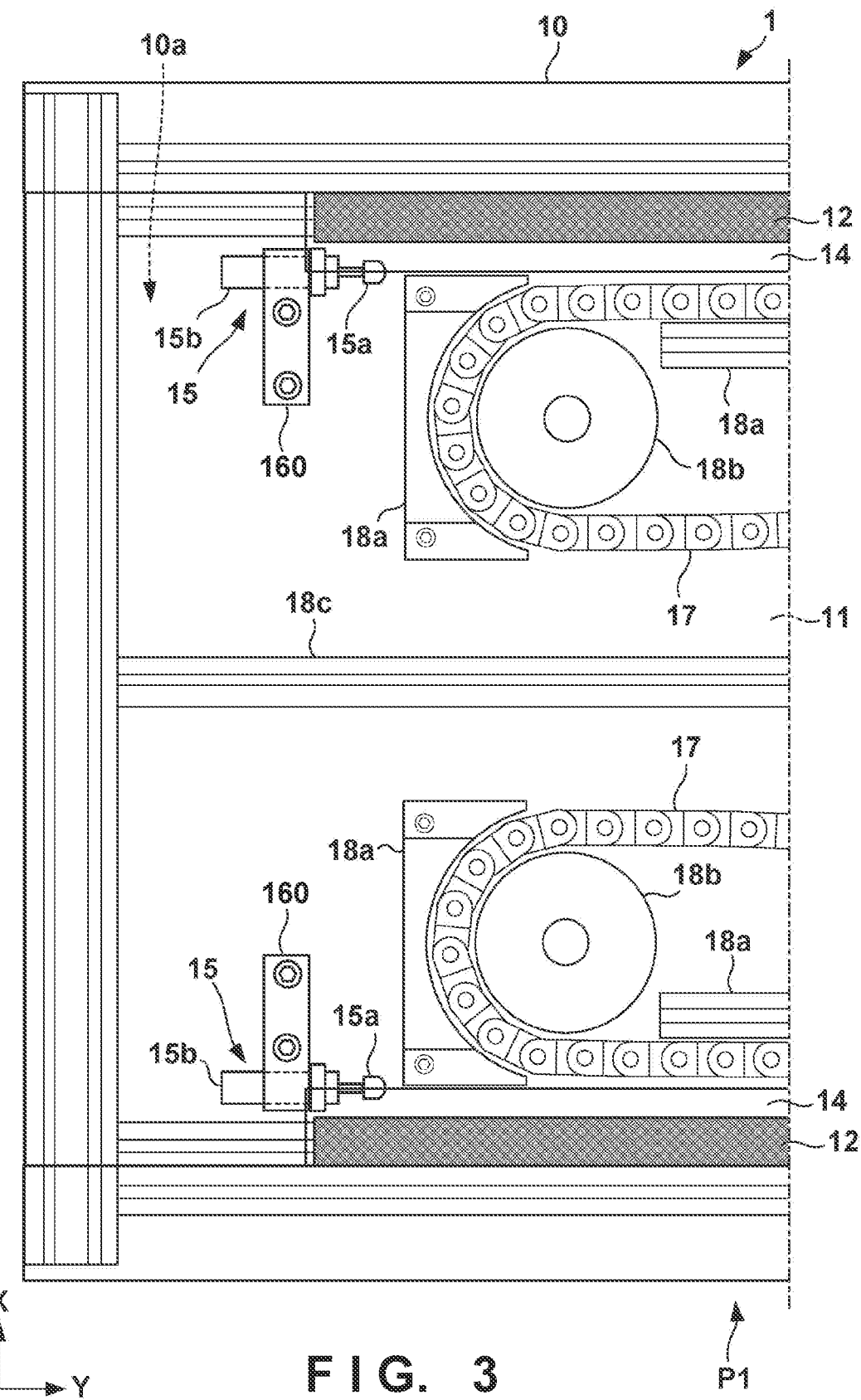
FIG. 3 is an enlarged view of a portion 1A in FIG. 2.
Figure 4:
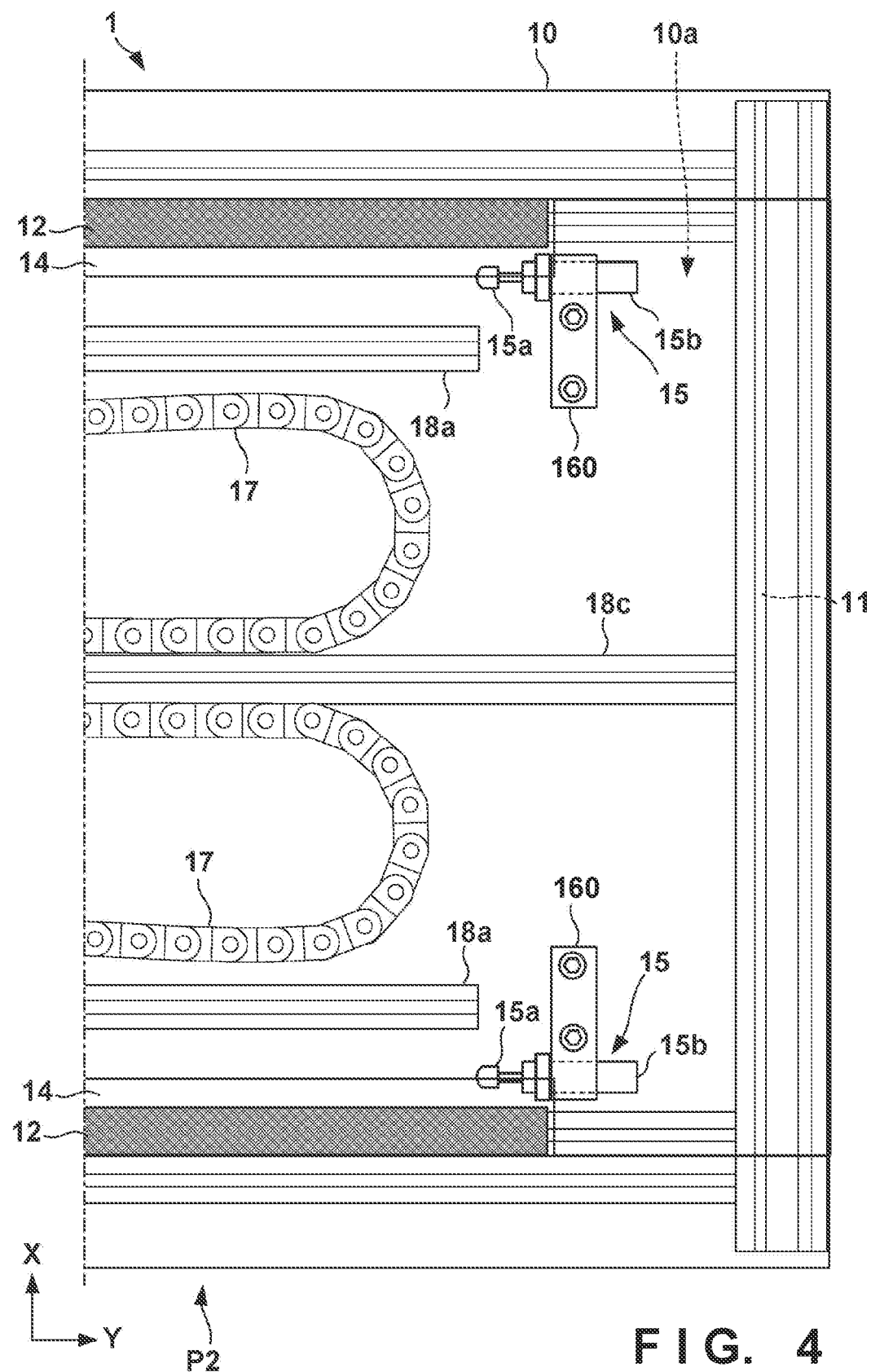
FIG. 4 is an enlarged view of a portion 1B in FIG. 2.

The base unit 1 includes a box-shaped frame body 10 opening upward, a cover 11 that covers the opening of the frame body 10 and forms the upper surface of the base unit 1, and a pair of rail members 12 apart in the X direction. The base unit 1 also includes passage members 16. FIG. 2 is a plan view of the base unit 1 seen through the cover 11 to show an internal space 10a of the frame body 10, and FIGS. 3 and 4 are enlarged views of portions 1A and 1B in FIG. 2.

The pair of rail members 12 are plate-shaped members, which are extended in the Y direction and in parallel fixed to the frame body 10. The pair of rail members 12 form the travel path. The upper surface of each rail member 12 is exposed to the upper surface of the base unit 1. When the travel rollers 22 and 23 (to be described later) of the moving unit 2 roll in contact with the rail members 12, the moving unit 2 (traverser main body T) travels on the base unit 1. Between the cover 11 and each rail member 12, a gap 14 extending in the Y direction along the rail member 12 is formed. The internal space 10a surrounded by the cover 11 and the frame body 10 communicates with the external space above the base unit 1 via the gap 14.

The passage members 16 are tilting plates arranged on both sides of the frame body 10 in the X direction. The passage members 16 form steps used by an operator to cross the base unit 1. In other words, the passage members 16 define a passage in the base unit 1, which is used by the operator to cross the base unit 1. When the passage members 16 are provided, an operator or a carriage can cross the base unit 1 during stop of the moving unit 2, and the mobility of the operator in the factory where the traverser 100 is installed can be improved.

Figure 15:
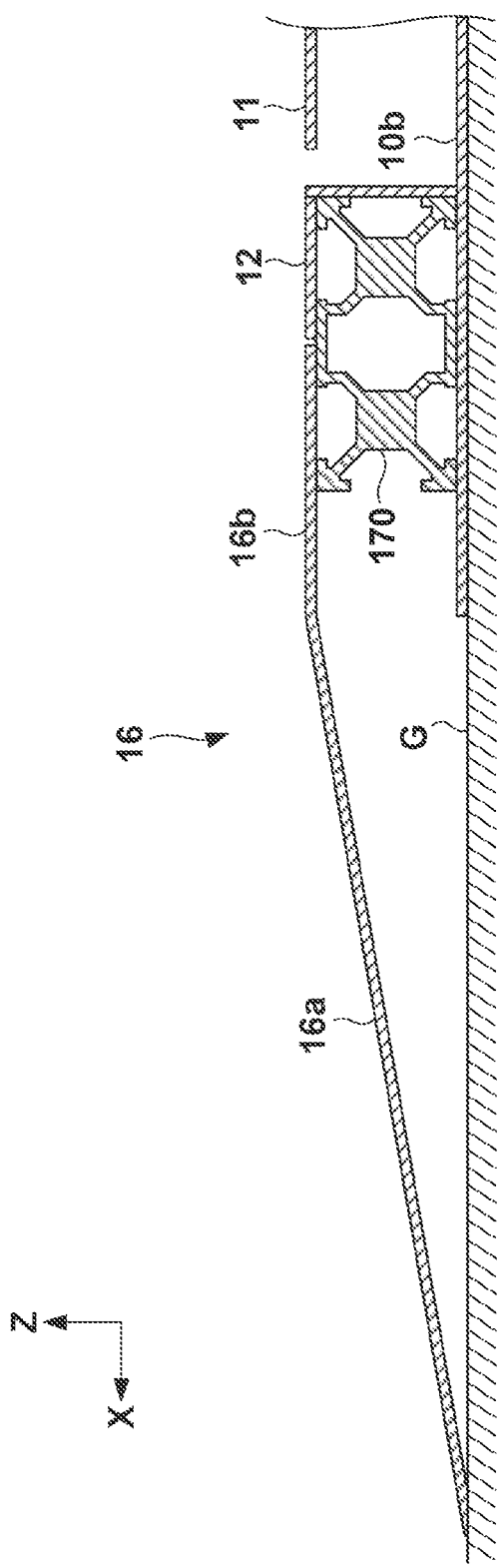
FIG. 15 is a sectional view taken along a line C-C in FIG. 1B.

FIG. 15 is a sectional view taken along a line C-C in FIG. 1B. The passage member 16 is extended from an installation surface (the floor surface in the factory) G on which the base unit 1 is installed to the upper surface of the rail member 12. The passage member 16 is formed by, for example, a steel plate, and includes a tilting portion 16a and a horizontal portion 16b. Since the tilting portion 16a is provided, the step difference between the frame body 10 and the installation surface G can be eliminated, and a smooth slope can be formed. The horizontal portion 16b is fixed to a constituent member 170 of the frame body 10. To fix the horizontal portion 16b to the constituent member 17, a screwing structure may be used, or a structure that engages engaging portions (for example, bent portions or concave and convex portions) provided on these may be employed.

Referring back to FIGS. 3 and 4, the frame body 10a defined by the frame body 10 also functions as a storage space for a cable 13 connected the moving unit 2. The internal space 10a is divided into two parts by a partition member 18c.

The cable 13 includes at least a power cable used to supply power from an external electric circuit to a travel motor 271 of the moving unit 2. The cable 13 may also include a communication cable used for communication between a host device (not shown) and a control circuit 4. The cover 11 is a thin plate member that covers the internal space (storage space) 10a, and the cover 11 suppresses entry of dust and the like into the internal space 10a. The cable 13 is supported by a cable protection guide device (cable bear®) 17.

In this embodiment, two cable protection guide devices 17 in a laid state are provided in the frame body 10. If the cable 13 includes a power cable and a communication cable, one cable protection guide device 17 may support the power cable, and the other cable protection guide device 17 may support the communication cable. Note that a configuration that does not partition the internal space 10a by the partition member 18c can also be employed. In this case, one cable protection guide device 17 is provided. If the cable 13 includes a power cable and a communication cable, these cables may be supported by the one cable protection guide device 17.

Each cable protection guide device 17 is disposed to meander in the internal space 10a, and its movement is guided by a plurality of guides 18a provided in the frame body 10, the partition member 18c, and one roller 18b. The plurality of guides 18a include a linear member 18a-1, and an arc member 18a-2 around the roller 18b. The partition member 18c functions as a linear guide.

One end 17a of the cable protection guide device 17 is connected to the moving unit 2 via a connecting tool (not shown) that passes through the gap 14, and the other end 17b is fixed to the frame body 10. One end 13a of the cable 13 is extended to the outside of the frame body 10 via the gap 14.

If the cable 13 is a power cable, the one end 13a is connected to the power supply unit (not shown) of the moving unit 2. The power supply unit supplies power to the travel motor 271 of a drive unit 25, a conveyance motor 371 of a drive unit 35, and the like. The other end 13b is connected to an external electric circuit (for example, a power supply device) (not shown) arranged outside the base unit 1.

If the cable 13 is a communication cable, the one end 13a is connected to the control circuit 4 of the moving unit 2 via the gap 14. The control circuit 4 controls the travel motor 271 of the drive unit 25 and the conveyance motor 371 of the drive unit 35. The other end 13b is connected to a host device (for example, a PLC) (not shown) arranged outside the base unit 1.

When the gap 14 is provided, it is possible to connect the moving unit 2 and the internal space 10a of the base unit 1 while arranging the moving unit 2 on the base unit 1.

The two end portions of each of the rail members 12 in the frame body 10 are provided with stop members 15 that are brought into contact with the moving unit 2. Each stop member 15 is fixed to the frame body 10 via a support member 160. In this embodiment, four stop members 15 are provided. Of these, the two stop members 15 shown in FIG. 3 stop the moving unit 2 (traverser main body T) at the stop position P1, and the remaining two stop members 15 shown in FIG. 4 stop the moving unit 2 at the stop position P2.

In this embodiment, each stop member 15 is a shock absorber that mitigates an impact when contacting the moving unit 2, and includes a rod 15a, and a cylinder 15b that stores the rod 15a such that it can freely move back and forth. The stop members 15 are arranged near the end portions of the rail members 12 while making the rods 15a face each other in the Y direction. The distal end of each rod 15a forms a contact portion that comes into contact with the moving unit 2, and is located near the lower portion of the gap 14. The cylinder 15b stores, for example, a spring that biases the rod 15a in a forward direction, a piston provided at an end portion of the rod 15a, and a liquid that resists the movement of the piston. When the moving unit 2 contacts the rod 15a, the rod 15a moves backward in the cylinder 15b and mitigates the impact of contact. As the stop member 15, a solid member may be used. However, when a shock absorber including a movable portion is used, as in this embodiment, the durability of the traverser 100 can be improved.

<Moving Unit>

Figure 5:
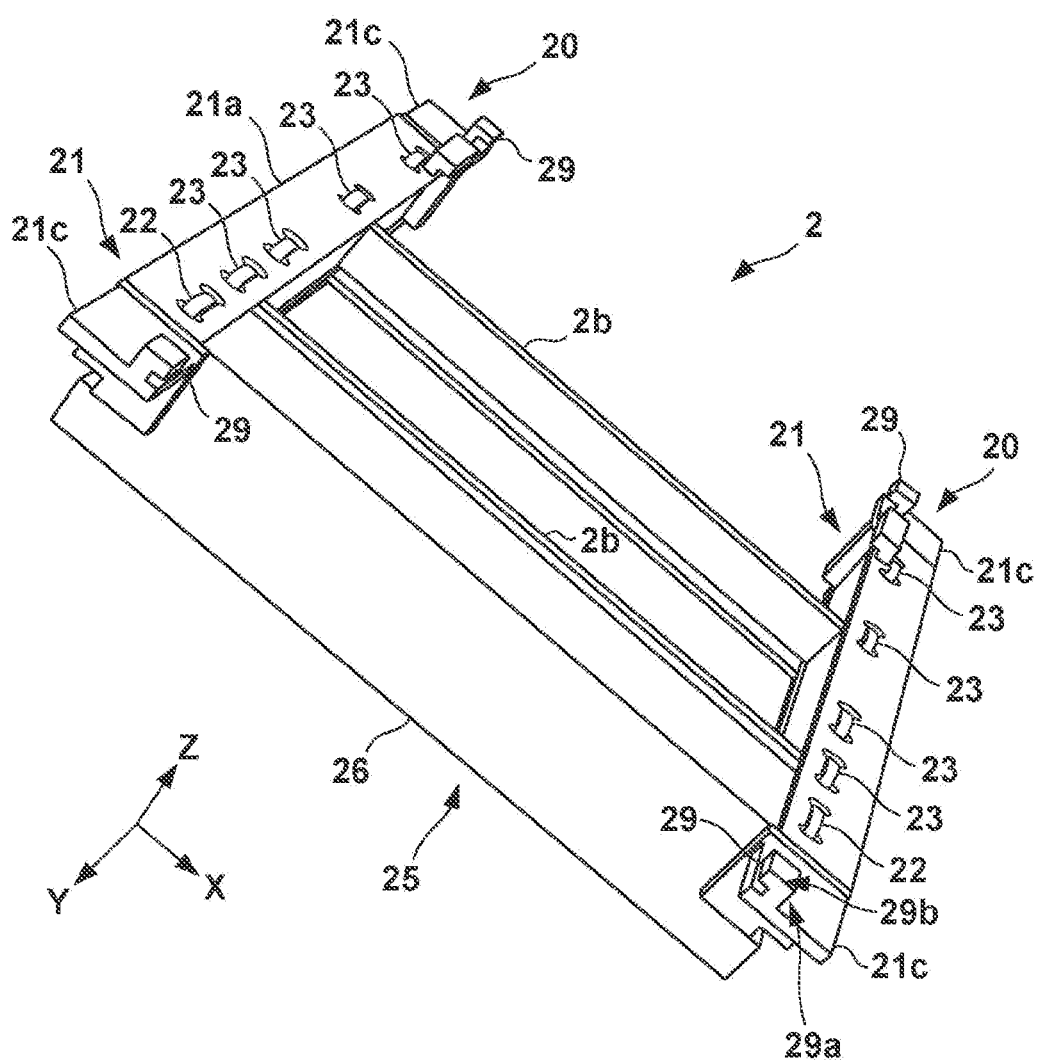
FIG. 5 is a perspective view of a moving unit.

The outline of the moving unit 2 will be described with reference to FIGS. 1A and 5. FIG. 5 is a perspective view of the moving unit 2 viewed from the bottom surface side. The moving unit 2 includes two roller units 20 arranged in parallel while being apart in the X direction, and the drive unit 25 that is provided to connect the two roller units 20 and functions as the drive source of the moving unit 2. The two roller units 20 are connected by a plurality of connecting members 2b, and this holds the roller units 20 apart in parallel.

Each roller unit 20 includes a roller array in which the travel roller 22 that is a drive roller and the plurality of travel rollers 23 that are driven rollers are arrayed along the moving direction (Y direction). The travel rollers 22 and 23 roll on the rail member 12, and this makes the moving unit 2 travel in the Y direction. Each roller unit 20 includes a support body (frame) 21 that supports the travel rollers 22 and 23 and mechanisms to be described later. The support body 21 includes a base plate 21a that forms the bottom portion of the roller unit 20 and extends in the Y direction, and support plates 21c provided at the front and rear ends of the base plate 21a in the Y direction.

Each support plate 21c includes a stopper contact portion 29. The stopper contact portion 29 is a portion that contacts the stop member 15 at the stop position P1 or P2. The stopper contact portion 29 has an L shape including a support portion 29a extending downward in the Z direction from the lower surface of the support plate 21c, and a contact portion main body 29b extending from the lower end portion of the support portion 29a to the center of the roller unit 20. Along with the travel of the moving unit 2, the support portion 29a moves along the gap 14, and the contact portion main body 29b contacts the rod 15a of the stop member 15. In addition, the lower surface of the support plate 21c also supports a rail contact portion 28 to be described later (see FIG. 6).

Figure 6:
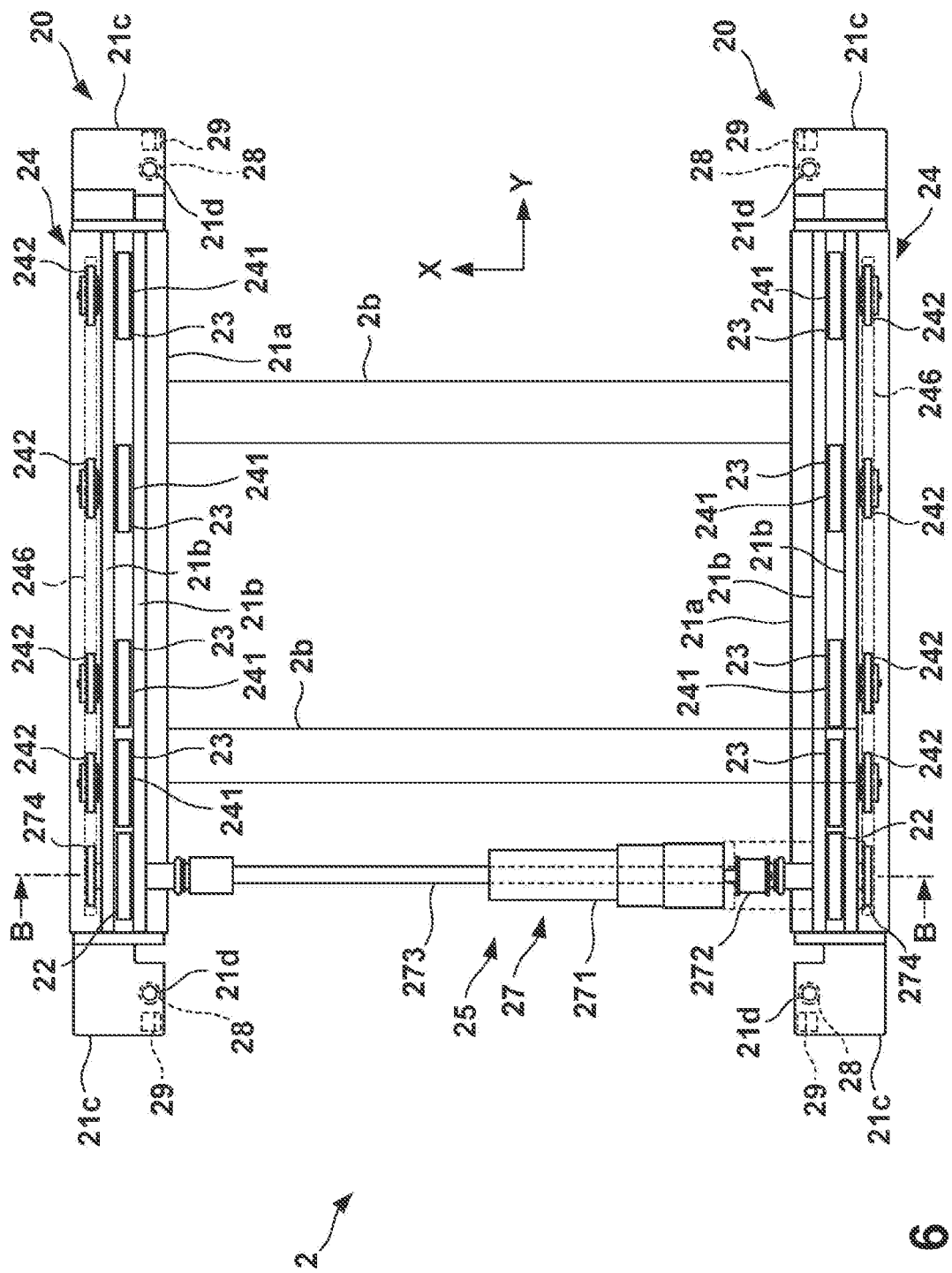
FIG. 6 is an explanatory view of the drive system of the moving unit.
Figure 7:
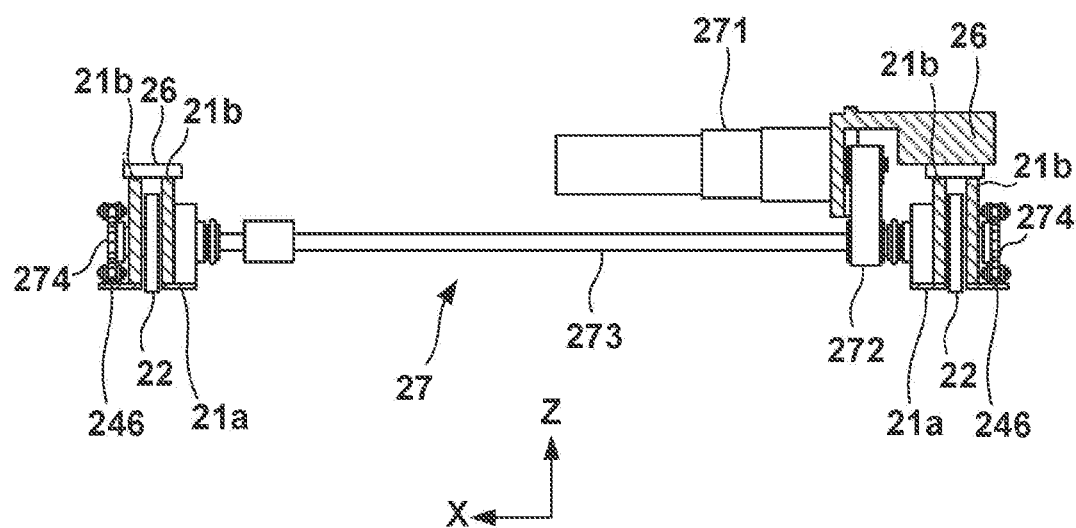
FIG. 7 is an explanatory view of the drive system of the moving unit.
Figure 8:
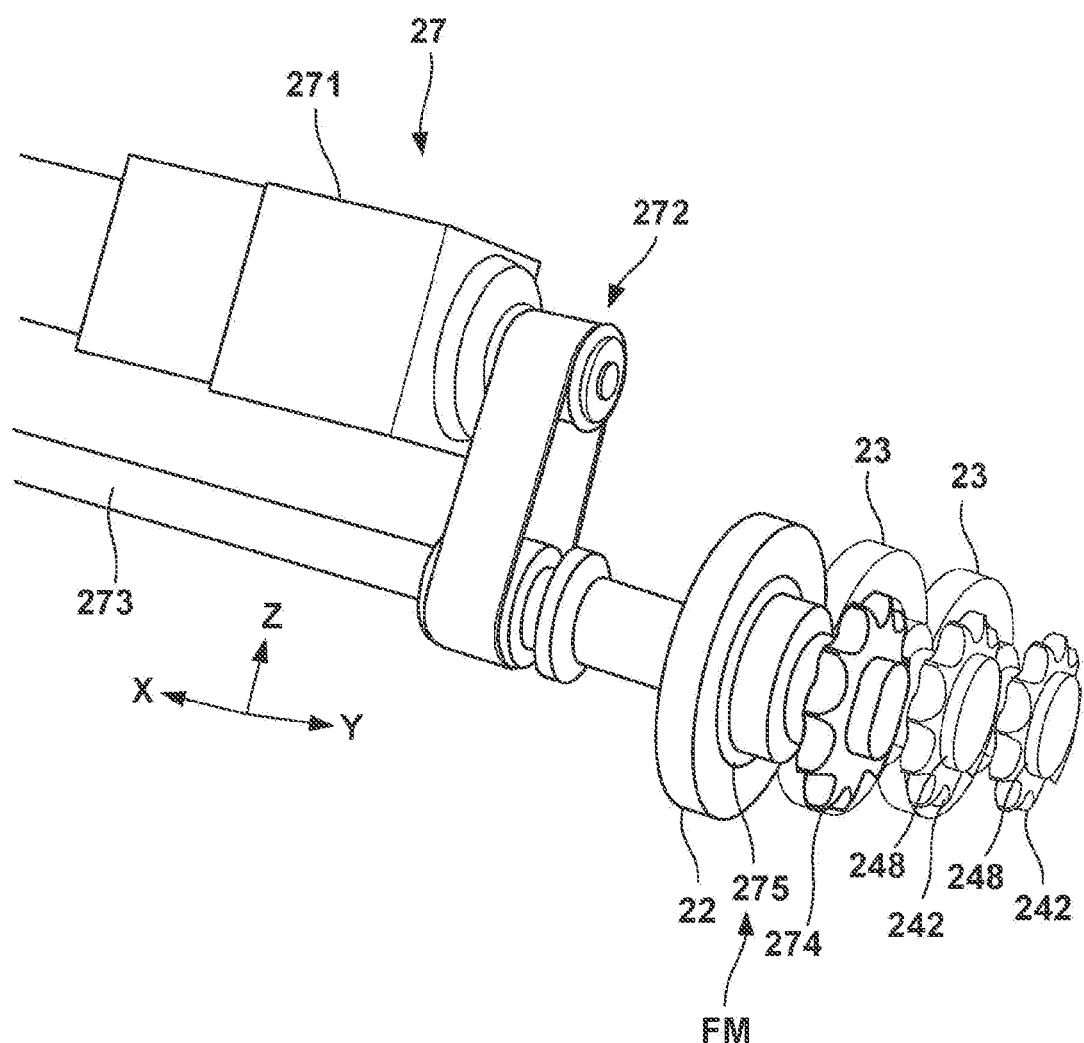
FIG. 8 is a partial perspective view of the drive system of the moving unit.

The configuration of the drive system of the moving unit 2 will be described with reference to FIGS. 5 to 8. FIG. 6 is a plan view of the moving unit 2 whose exterior portion is removed. The drive unit 25 includes a drive mechanism 27 supported by a support body (a frame; see FIG. 5, not shown in FIG. 6) 26. The drive mechanism 27 is a mechanism configured to give a rotation driving force to the travel rollers 22 and 23, and includes the travel motor 271 that supplies the rotation driving force, a belt transmission mechanism 272, a drive shaft 273, a drive wheel 274, and a friction transmission mechanism FM. FIG. 7 is a longitudinal sectional view (a sectional view taken in the direction of arrows B in FIG. 6) of the moving unit 2 near the drive shaft 273. FIG. 8 is a partial perspective view of the drive mechanism 27.

The travel motor 271 is, for example, a DC motor, and includes a control board (not shown) configured to control the rotation direction and speed of the rotating shaft. The rotating shaft is supported, by the support body 26, above the drive shaft 273 and in parallel to the drive shaft 273.

The control board includes, for example, a processor represented by a CPU, a storage device such as a RAM or a ROM, an input/output interface that relays between an external device and the processor, and a communication interface that performs communication with a host controller such as a PLC. The control board is arranged, for example, inside the housing of the travel motor 271 and connected to a power supply unit that supplies power to the travel motor 271 and the like.

The control board outputs a control signal representing the rotation direction of the rotating shaft and a PWM (Pulse Width Modulation) signal representing the rotation speed, and controls the rotation of the rotating shaft of the travel motor 271.

In addition, a rotary encoder 41 is attached to the rotating shaft of the travel motor 271. The rotation amount of the rotating shaft detected by the rotary encoder 41 is input to the control board.

If the output signal of the rotary encoder 41 does not change for a predetermined time, the control board stops outputting the control signal (CW or CCW signal) for instructing rotation of the travel motor 271. This stops the drive of the travel motor 271.

In this way, if the rotation of the rotating shaft of the travel motor 271 is not detected for a predetermined time, the control board of the travel motor 271 stops the drive of the rotating shaft of the travel motor 271.

In the above-described method, the physical stop of the rotation of the rotating shaft of the travel motor 271 is detected using the rotary encoder. However, the physical stop of the rotation of the rotating shaft of the travel motor 271 may be detected using the current value of the control signal (CW or CCW signal) for instructing rotation.

For example, the current value of the control signal (CW or CCW signal) increases when the rotation of the rotating shaft is impeded. Hence, a current value when a load is applied to the rotating shaft of the rotating travel motor 271, and the rotation of the rotating shaft physically stops is set to a threshold. If it is detected that the current value of the control signal (CW or CCW signal) continuously exceeds the threshold for a predetermined time, the physical stop of the rotating shaft of the travel motor 271 can be detected.

When the rotation of the rotating shaft of the travel motor 271 is physically stopped, the drive of the rotating shaft is stopped. The rotation of the rotating shaft is physically stopped when, for example, a foreign substance such as a bolt or a screw is fallen in the gap 14 and caught between a drive wheel 242 or 274 and a drive transmission member 246 or between the drive wheel 242 or 274 and a support plate 21b. At this time, the rotation of the drive wheel 242 or 274 or the travel of the drive transmission member 246 is impeded.

Here, in a case in which a general-purpose motor is used as the travel motor 271, even if the rotation of the drive wheel 242 or 274 or the travel of the drive transmission member 246 is impeded, and the rotating shaft of the motor physically stops, the motor continuously rotates. As a result, the rotating shaft that cannot physically rotate is forcibly continuously rotated by the motor. In the worst case, the motor fails or breaks.

On the other hand, in the traverser 100 according to this embodiment, if the rotation of the drive wheel 242 or 274 or the travel of the drive transmission member 246 is impeded by a foreign substance, the rotation of the drive shaft 273 and the travel of the belt transmission mechanism 272 stop. However, in the traverser 100 according to this embodiment, the travel motor 271 "stops the drive of the rotating shaft of the travel motor 271 if the rotation of the rotating shaft of the travel motor 271 is not detected for a predetermined time", as described above. Hence, even if the rotation of the rotating shaft of the travel motor 271 is physically stopped, the drive of the rotating shaft of the travel motor 271 is stopped upon detecting this. That is, if the rotating shaft of the travel motor 271 is physically stopped, the drive of the] rotating shaft of the travel motor 271 is stopped upon detecting this. For this reason, the travel motor 271 never forcibly continuously rotates the rotating shaft that cannot rotate. As a result, a failure or breakage of the travel motor 271 never occurs due to the foreign substance, and the drive of the rotating shaft of the travel motor 271 is safely stopped.

The belt transmission mechanism 272 transmits the rotation driving force of the travel motor 271 to the drive shaft 273 and rotates the drive shaft 273. The drive shaft 273 is a member extended in the X direction. In this embodiment, a plurality of shafts are connected via shaft couplings to form one shaft as a whole. The support body 21 of each roller unit 20 includes a pair of support plates 21b that rotatably support the rotation center shafts of the travel rollers 22 and 23. The pair of support plates 21b are provided apart from each other at an arbitrary interval in the X direction and in parallel stand on the base plate 21a. The travel rollers 22 and 23 are arranged between the support plates 21b.

The drive shaft 273 is rotatably and pivotally supported by the pair of support plates 21b located apart in the X direction. The travel roller 22 is provided between the pair of support plates 21b, and each travel roller 22 is attached to the drive shaft 273 via the friction transmission mechanism FM. The friction transmission mechanism FM is a mechanism configured to transmit the rotation driving force of the travel motor 271 to the travel roller 22 by a friction force, and includes a friction transmission member 275 in this embodiment.

Figure 9:
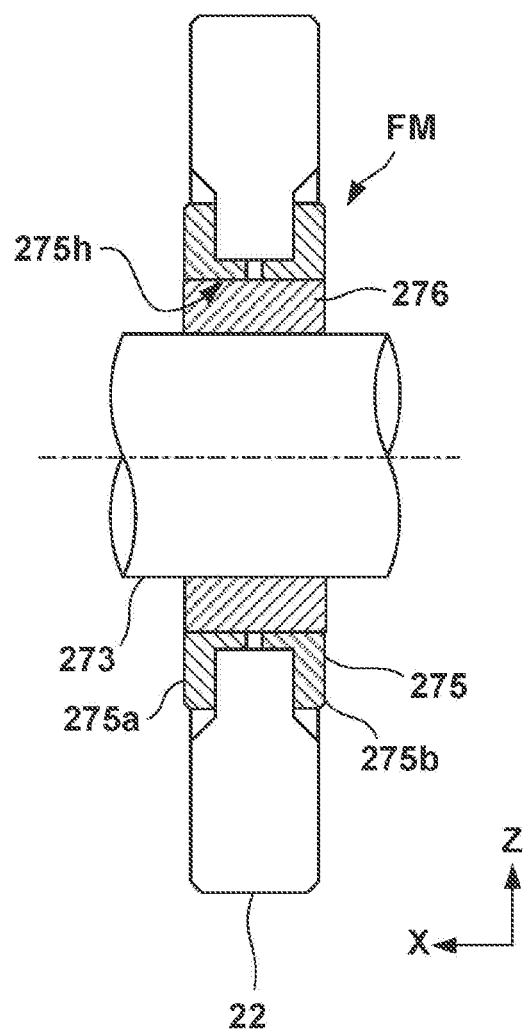
FIG. 9 is an explanatory view of the friction transmission structure of a travel roller.

FIG. 9 is a longitudinal sectional view of the travel roller 22. The friction transmission member 275 includes a pair of ring members that are provided on the peripheral surface of the drive shaft 273 and attach the travel roller 22 to the drive shaft 273. In this embodiment, the friction transmission member 275 is formed by a pair of flanged bushes 275a and 275b fitted in the center hole of the travel roller 22. In the contact portion between the drive shaft 273 and the friction transmission member 275, a bush 276 is provided on the peripheral surface of the drive shaft 273. For example, the drive shaft 273 is fitted in the hole of the bush 276. The portion of the bush 276 on the drive shaft 273 is inserted into a hole 275h at the center of the friction transmission member 275, and the bush 276 is located in the hole 275h of the friction transmission member 275. The friction transmission member 275 and the bush 276 are not fixed. Transmission of the rotation driving force from the drive shaft 273 to the friction transmission member 275 is done by friction transmission. Hence, if an excessive load that resists the rotation of the travel roller 22 acts on the travel roller 22, idling (slip) occurs between the bush 276 provided on the drive shaft 273 and the friction transmission member 275. The drive shaft 273 continuously rotates, but the travel roller 22 stops rotating.

Referring back to FIGS. 5 to 8, the drive wheels 274 are provided at the two end portions of the drive shaft 273. The drive wheels 274 are fixed to the drive shaft 273 and rotate integrally with the drive shaft 273. The rotation driving force of each drive wheel 274 is transmitted to the travel rollers 23 via a travel transmission mechanism 24 provided in the roller unit 20.

The travel transmission mechanism 24 includes drive shafts 241 of the travel rollers 23, the drive wheels 242 provided at the outer end portions of the drive shafts 241, and the driving force transmission member 246. The drive shafts 241 are provided in parallel to the drive shaft 273 and rotatably supported by the pair of support plates 21b. The drive wheel 242 is provided at one end of each drive shaft 241 (the end of the moving unit 2 on the outer side in the widthwise direction). In each roller unit 20, one drive wheel 274 provided on the drive shaft 273, and the plurality of drive wheels 242 provided on the drive shafts 241 are arrayed in one line along the Y direction. The endless driving force transmission member 246 is wound around the drive wheels 274 and 242. Hence, along with the rotation of the drive shaft 273, the drive wheel 274 rotates, and the drive wheels 242 are rotated by the rotation of the drive wheel 274.

In this embodiment, the driving force transmission member 246 is a chain, and the drive wheels 274 and 242 are sprockets that mesh with the chain. These form a chain transmission mechanism. However, a belt transmission mechanism may be employed in place of the chain transmission mechanism. Alternatively, a gear mechanism in which the drive wheels 274 and 242 and the driving force transmission member 246 are made of gears may be employed.

Figure 10:
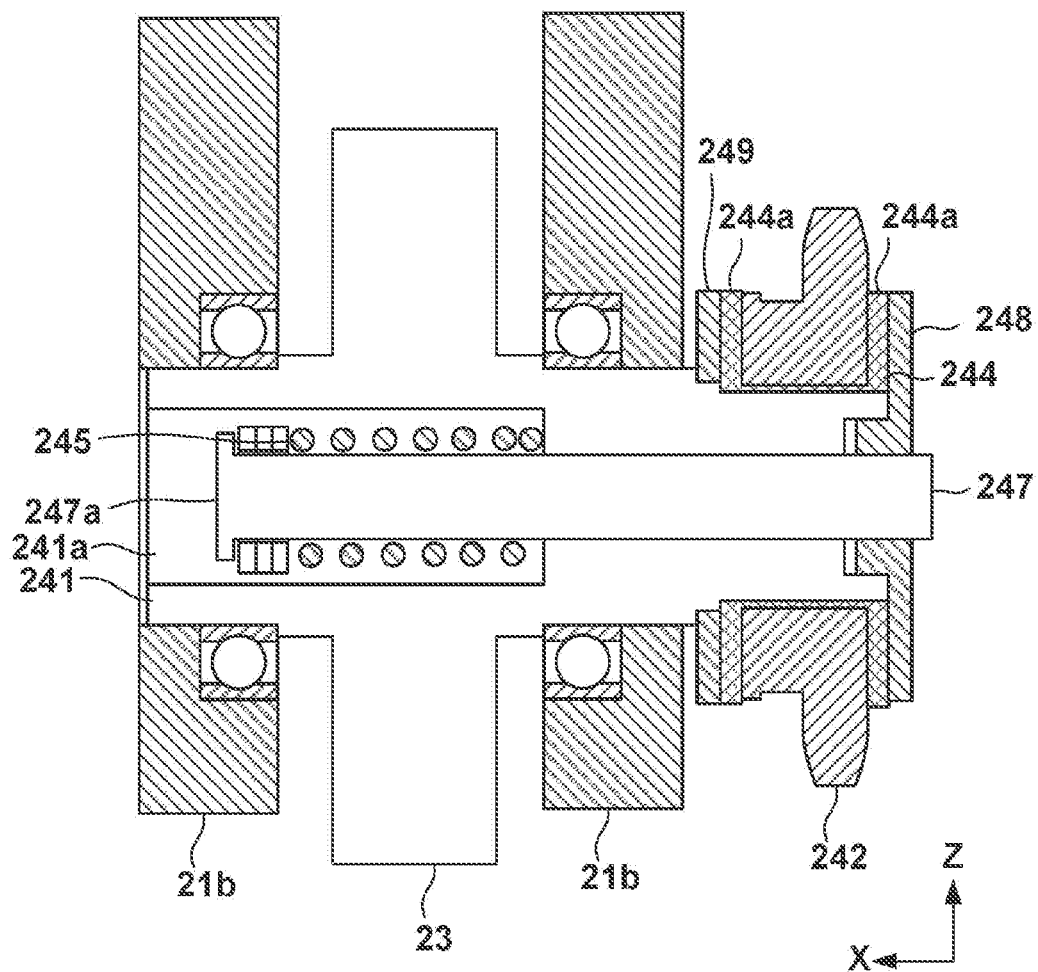
FIG. 10 is an explanatory view of the friction transmission structure of a travel roller.

Of the configuration of the travel transmission mechanism 24, the configuration for each travel roller 23 will further be described with reference to FIG. 10. FIG. 10 is a longitudinal sectional view of the periphery of the travel roller 23. In this embodiment, the travel roller 23 is formed integrally with the drive shaft 241, and the drive shaft 241 is supported by the pair of support plates 21b via a ball bearing.

A transmitted portion 249 and a friction transmission member 244 are provided on the peripheral surface of the drive shaft 241. The transmitted portion 249 is a disc-shaped member provided in the middle of the drive shaft 241 and extending outward in the radial direction of the drive shaft 241. The transmitted portion 249 is fixed to the drive shaft 241 and rotates integrally with the drive shaft 241. The transmitted portion 249 and the drive shaft 241 may be formed as one member.

The friction transmission member 244 is provided on the peripheral surface of the drive shaft 241 and intervenes between the drive wheel 242 and the drive shaft 241. The friction transmission member 244 is formed by a pair of flanged bushes. The flanged bushes are attached from both sides of the drive wheel 242 to cover both sides of the drive wheel 242 and the inner peripheral surface of the drive wheel 242. In this embodiment, the friction transmission member 244 forms flange portions 244a whose end portions in the axial direction of the drive shaft 241 project in the radial direction. The drive wheel 242 is attached between the flange portions 244a, and the side surfaces of the drive wheel 242 and the flange portions 244a are in contact. One flange portion 244a is sandwiched between one side surface of the drive wheel 242 (the side surface on the side of the travel roller 23) and the transmitted portion 249. The friction transmission member 244 and the drive shaft 241 are not fixed. Transmission of the rotation driving force from the drive wheel 242 to the drive shaft 241 is done by friction transmission between the one side surface of the drive wheel 242 (the side surface on the side of the travel roller 23 (the left side in FIG. 10)) and the transmitted portion 249 via the flange portion 244a.

To bias the sandwiching force of the flange portion 244a between the one side surface of the drive wheel 242 (the side surface on the side of the travel roller 23) and the transmitted portion 249, a biasing member 245 is provided. In this embodiment, the biasing member 245 is a coil spring. However, another elastic member such as rubber may be used. In the drive shaft 241, a through hole 241a that is concentric with the drive shaft 241 and extends through the drive shaft 241 in the axial direction is formed. The through hole 241a is a stepped hole whose diameter is small on the side of the drive wheel 242 and large on the opposite side (the side of the travel roller 23).

A rod 247 is inserted in the through hole 241a. A pressing member 248 is fixed to one end portion of the rod 247 (the end portion on the side of the drive wheel 242), and a stopper portion 247a is formed at the other end portion. The biasing member 245 is interposed between the stopper portion 247a and the wall surface of the step portion of the through hole 241a. The pressing member 248 is a disc-shaped member that contacts the flange portion 244a on the opposite side of the friction transmission member 244 (the side not in contact with the transmitted portion 249).

By biasing of the biasing member 245, the rod 247 and the pressing member 248 are biased to the side of the travel roller 23. Accordingly, a sandwiching force for pressing the flange portion 244a on the side (the left side in FIG. 10) in contact with the transmitted portion 249 is generated between the one side surface of the drive wheel 242 (the side surface on the side of the travel roller 23) and the transmitted portion 249. Hence, the rotation driving force of the drive wheel 242 is frictionally transmitted to the drive shaft 241 via the flange portion 244a. If an excessive load that resists the rotation of the travel roller 23 acts on the travel roller 23, idling (slip) occurs between the drive shaft 241 and the friction transmission member 244. The drive wheel 242 continuously rotates, but the travel roller 23 stops rotating.

Note that in this embodiment, the biasing member 245 is incorporated in the drive shaft 241. However, any other structure in which, for example, the biasing member 245 is arranged on the peripheral surface of the drive shaft 241 can also be employed. It is only necessary to bias the sandwiching force between the one side surface of the drive wheel 242 (the side surface on the side of the travel roller 23) and the transmitted portion 249.

Figure 11:
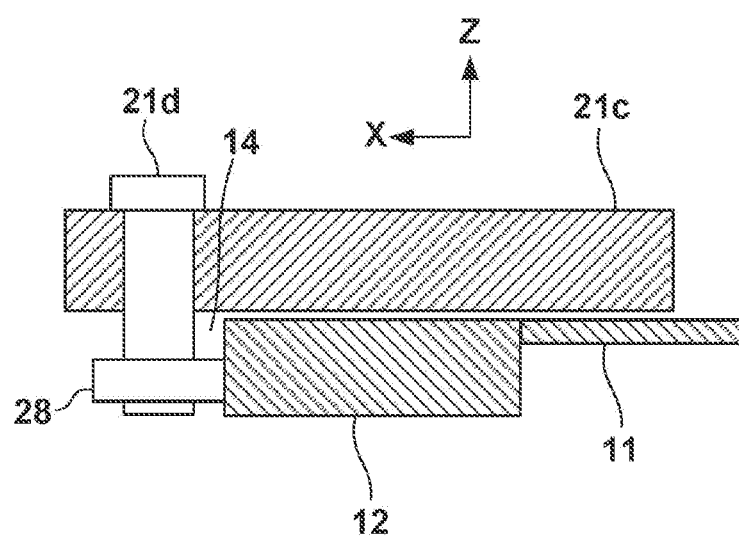
FIG. 11 is an explanatory view of the support structure of a contact portion corresponding to a sectional view taken along a line A-A in FIG. 1A.

Referring to FIG. 6, the rail contact portion 28 is supported on each support plate 21c via a support portion 21d. FIG. 11 is a sectional view taken along a line A-A in FIG. 1A, and shows the arrangement of the rail contact portion 28 and peripheral components in a state in which the moving unit 2 is mounted on the base unit 1. The rail contact portion 28 is a roller arranged on the lower side of the support plate 21c. The support portion 21d is a shaft member extending in the vertical direction (Z direction). The upper end portion is fixed to the support plate 21c, and the rail contact portion 28 is rotatably supported on the lower end portion. The support portion 21d extends up to the lower side of the cover 11 via the gap 14. The rail contact portion 28 provided at the lower end of the support portion 21d contacts the side surface of the rail member 12 (in FIG. 11, the left side surface or the inner side surface of each of the rail members 12 provided in parallel). Hence, the four rail contact portions 28 prevent the moving unit 2 from derailing from the rail members 12 when the moving unit 2 moves on the rail members 12.

<Conveyance Unit>

Figure 12:
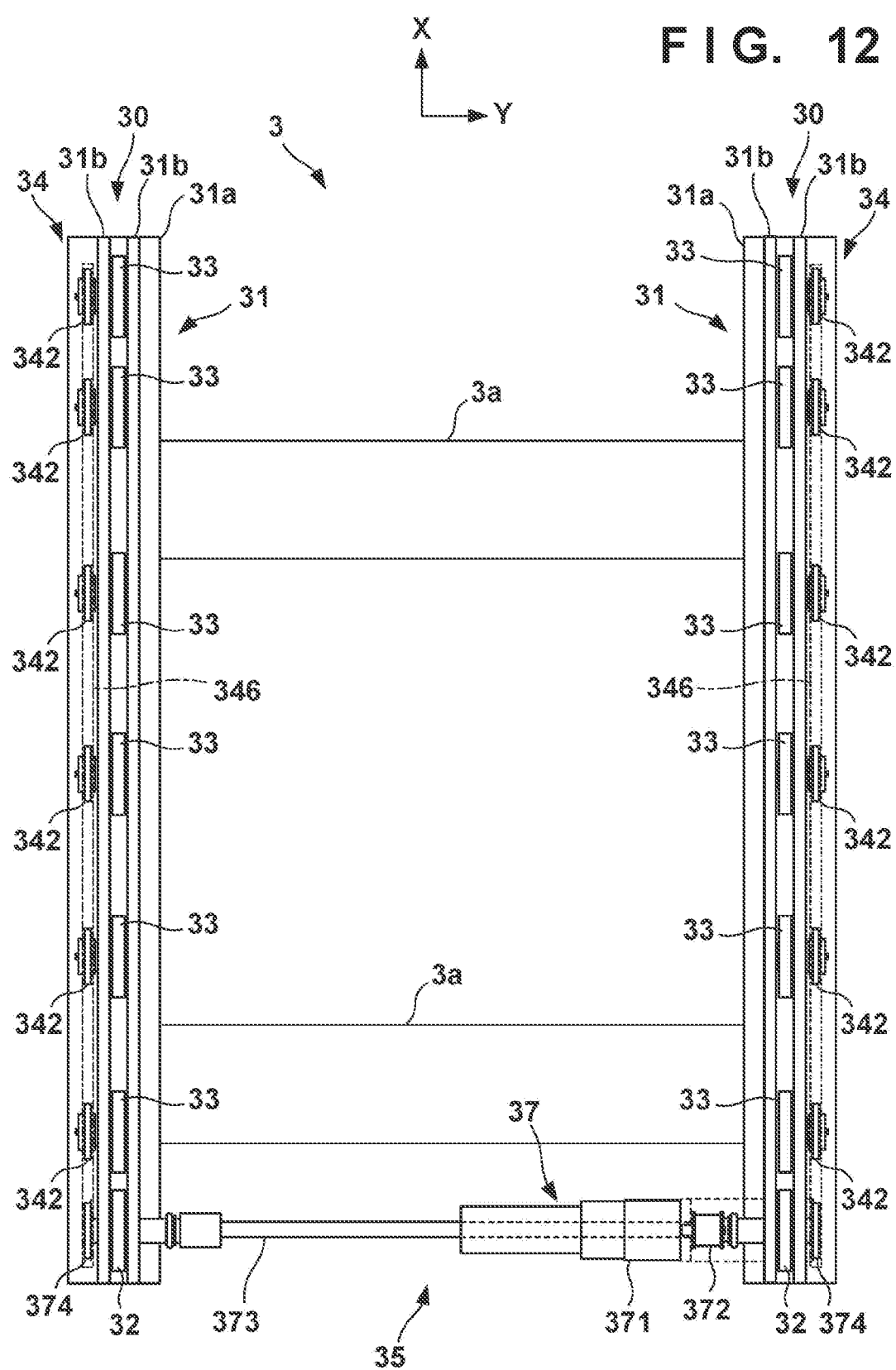
FIG. 12 is an explanatory view of the drive system of a conveyance unit.

The configuration of the conveyance unit 3 will be described with reference to FIGS. 1A and 12. FIG. 12 is a plan view of the conveyance unit 3 whose exterior portion is removed. The conveyance unit 3 includes two roller units 30 arranged in parallel while being apart in the Y direction, and the drive unit 35 that is provided to connect the two roller units 30 and functions as the drive source of the conveyance unit 3. The two roller units 30 are connected by a plurality of connecting members 3a, and this holds the roller units 30 apart in parallel.

Concerning the drive mechanism, the roller units 30 and the drive unit 35 have the same structures as the roller units 20 and the drive unit 25 except the number of rollers. In other words, the travel mechanism of the moving unit 2 and the conveyance mechanism of the conveyance unit 3 have the same structure. Hence, both can be formed using common components. This makes it possible to decrease the number of components of the traverser main body T and reduce the cost, and also facilitates component management.

Each roller unit 30 includes a roller array in which the conveyance roller 32 that is a drive roller and the plurality of conveyance rollers 33 that are driven rollers are arrayed in one line (X direction). As the conveyance rollers 32 and 33 rotate, the conveyance target object W on these rollers is conveyed in the X direction. As the conveyance roller 32, the same roller as the travel roller 22 can be used. As the conveyance rollers 33, the same roller as the travel roller 23 can be used.

Each roller unit 30 includes a support body (frame) 31 that supports the conveyance rollers 32 and 33 and mechanisms to be described later. The support body 31 has the same configuration as the support body 21 of the moving unit 2, and includes a base plate 31a that forms the bottom portion of the roller unit 30 and extends in the X direction, and a pair of support plates 31b. On the other hand, unlike the support body 21 of the moving unit, the support body 31 of the conveyance unit 3 does not have a configuration corresponding to the support plate 21c. Also, the conveyance unit 3 does not have configurations corresponding to the contact portions 28 and 29 of the moving unit 2.

The drive unit 35 includes a drive mechanism 37 supported by a support body (frame) 36. The drive mechanism 37 is a mechanism configured to give a rotation driving force to the conveyance rollers 32, and includes the conveyance motor 371 that supplies the rotation driving force, a belt transmission mechanism 372, a drive shaft 373, and a drive wheel 374. The drive mechanism 37 has the same configuration as the drive mechanism 27 and can use the same components.

The conveyance motor 371 is, for example, a DC motor, and includes a control board (not shown) configured to control the rotation direction and speed of the rotating shaft. The rotating shaft is supported, by the support body 36, above the drive shaft 373 and in parallel to the drive shaft 373. Here, the control board has the same configuration as the control board of the drive unit 25. If the rotation of the conveyance motor 371 stops for a predetermined time, the control board stops the conveyance motor 371. The belt transmission mechanism 372 transmits the rotation driving force of the conveyance motor 371 to the drive shaft 373 and rotates the drive shaft 373. The drive shaft 373 is a member extended in the Y direction. In this embodiment, a plurality of shafts are connected via shaft couplings to form one shaft as a whole. The support body 31 of each roller unit 30 includes a pair of support plates 31b that rotatably support the rotation center shafts of the conveyance rollers 32 and 33. The pair of support plates 31b are provided apart from each other at an arbitrary interval in the Y direction and in parallel stand on the base plate 31a. The conveyance rollers 32 and 33 are arranged between the support plates 31b.

The drive shaft 373 is rotatably supported by the pair of support plates 31b located apart in the Y direction. The conveyance roller 32 is provided between the pair of support plates 31b, and each conveyance roller 32 is attached to the drive shaft 373 via a friction transmission member (not shown). Like the travel roller 22 of the moving unit 2, the conveyance roller 32 is attached to the drive shaft 373 via a friction transmission member corresponding to the friction transmission member 275 and bushes (neither are shown). Hence, if an excessive load that resists the rotation of the conveyance roller 32 acts on the conveyance roller 32, idling (slip) occurs between the bushes provided on the drive shaft 373 and the friction transmission member. The drive shaft 373 continuously rotates, but the conveyance roller 32 stops rotating.

The drive wheels 374 are provided at the two end portions of the drive shaft 373. The drive wheels 374 are fixed to the drive shaft 373 and rotate integrally with the drive shaft 373. The rotation driving force of each drive wheel 374 is transmitted to the conveyance rollers 33 via a conveyance transmission mechanism 34 provided in the roller unit 30.

The conveyance transmission mechanism 34 is the same mechanism as the travel transmission mechanism 24 except the number of rollers, and is a mechanism configured to transmit the rotation driving force of the drive wheels 374 to a drive wheel 342 of each conveyance roller 33 via a driving force transmission member 346. The mechanism of each conveyance roller 33 is also the same as the mechanism of each travel roller 23 shown in FIG. 10. The same components can be used here as well.

<Control Circuit>

Figure 13:
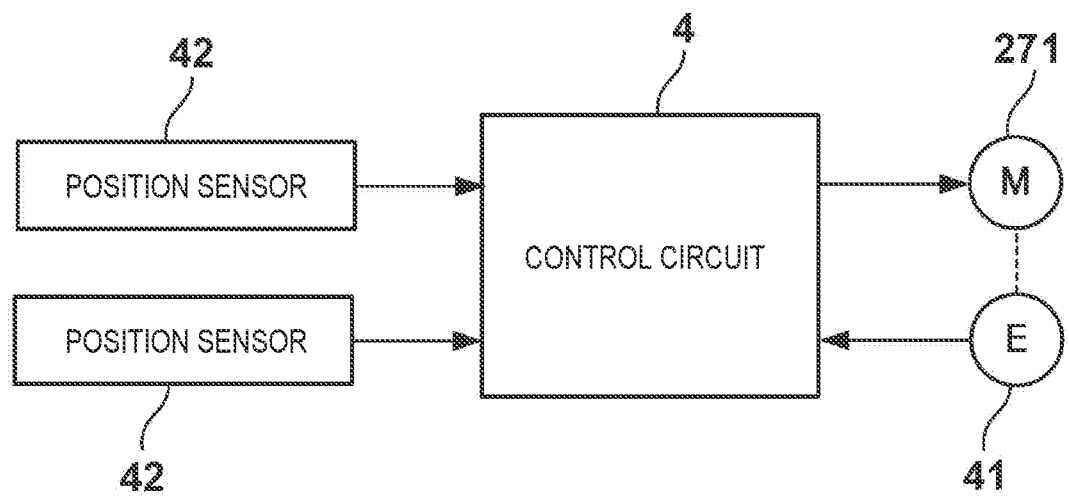
FIG. 13 is a block diagram of a control system.

FIG. 13 is a block diagram of the control system of the moving unit 2. The moving unit 2 includes the control circuit 4 that controls the travel motor 271. The rotary encoder 41 is attached to the drive shaft of the travel motor 271, and the rotation amount of the drive shaft detected by the rotary encoder 41 is input to the control circuit 4. Also, the traverser 100 is provided with position sensors 42 configured to detect the position of the moving unit 2. The position sensors 42 according to this embodiment are provided at the two stop positions P1 and P2, respectively. One position sensor 42 detects whether the moving unit 2 exists at the stop position P1, and the other position sensor 42 detects whether the moving unit 2 exists at the stop position P2. Each position sensor 42 is, for example, a mechanical sensor that is turned on by contact with the moving unit 2 or an optical sensor such as a photointerrupter that optically detects the existence of the moving unit 2.

The control circuit 4 is a microcomputer including, for example, a processor represented by a CPU, a storage device such as a RAM or a ROM, an input/output interface that relays between an external device and the processor, a communication interface that performs communication with a host controller, and the drive circuit of the travel motor 271. The control circuit 4 can be arranged, for example, inside the housing of the drive unit 25. To supply power to the travel motor 271 and the like, the cable 13 wired via the gap 14 is connected to the control circuit 4.

Control of the conveyance unit 3 may be performed by the control circuit 4 or a control circuit provided in the conveyance unit 3. Like the travel motor 271, a rotary encoder may be provided on the conveyance motor 371 to detect the rotation amount of the drive shaft of the conveyance motor 371. The control circuit provided in the conveyance unit 3 may have the same configuration as the control circuit 4, and may be configured to communicate with the control circuit 4.

As described above, since the conveyance rollers and the travel rollers can have the same configuration, and the conveyance transmission mechanism and the travel transmission mechanism can have the same configuration, the manufacturing cost can be suppressed.

<Example of Operation>

An example of control of the moving unit 2 by the control circuit 4 will be described. The control circuit 4 moves the moving unit 2 from the stop position P1 to the stop position P2 or from the stop position P2 to the stop position P1 in accordance with an instruction of the host controller. More specifically, the control circuit 4 controls the rotation direction, the start and stop of rotation, and the rotation speed of the travel motor 271.

First, the traverser main body T is moved from the stop position P1 to the stop position P2. When the traverser main body T reaches the stop position P2, the stopper contact portions 29 mechanically/physically contact the stop members 15. This impedes the movement of the traverser main body T, and the traverser main body T stops at the stop position P2.

At this time, the travel motor 271, the drive shaft 273, the drive wheels 274, the driving force transmission members 246, and the drive wheels 242 continuously rotate, but the rotation of the travel rollers 22 and 23 stops.

After the position sensor 42 detects that the moving unit 2 reaches the stop position P2, the conveyance target object W is transferred from the conveyor 62 on the unloading side to the conveyance unit 3.

After a predetermined time elapses from the start of the movement of the traverser main body T from the stop position P1 to the stop position P2, and it is confirmed that the conveyance unit 3 is not performing the transfer operation of the conveyance target object W, the traverser main body T moves from the stop position P2 to the stop position P1.

When the traverser main body T reaches the stop position P1, the stopper contact portions 29 mechanically/physically contact the stop members 15. This impedes the movement of the traverser main body T, and the traverser main body T stops at the stop position P1.

At this time, the travel motor 271, the drive shaft 273, the drive wheels 274, the driving force transmission members 246, and the drive wheels 242 continuously rotate, but the rotation of the travel rollers 22 and 23 stops.

After the position sensor 42 detects that the moving unit 2 reaches the stop position P1, the conveyance target object W is transferred from the conveyance unit 3 to the conveyor 61 on the loading side.

After a predetermined time elapses from the start of the movement of the traverser main body T from the stop position P2 to the stop position P1, and it is confirmed that the conveyance unit 3 is not performing the transfer operation of the conveyance target object W, the traverser main body T moves from the stop position P1 to the stop position P2.

By repeating these operations, the traverser 100 can convey the conveyance target object W between the conveyors 61 and 62.

In addition, when stopping the traverser main body T at the stop position P1 or P2, the stopper contact portions 29 mechanically/physically contact the stop members 15, thereby impeding the movement of the traverser main body T.

Here, the rotation driving force of the travel motor 271 is transmitted to the travel rollers 22 and 23 by friction transmission. At this time, if the movement of the moving unit 2 is impeded by the mechanical/physical contact between the stop members 15 and the stopper contact portions 29, and an overload more than the friction transmission force acts, slip occurs between the friction transmission member 275 and the bush 276 and between the friction transmission member 244 and the travel rollers 23. Hence, the travel motor 271 continuously rotates, but the rotation of the travel rollers 22 and 23 stops. That is, the travel rollers 22 and 23 have an accumulate function (also called a free flow function).

For this reason, in the traverser 100 according to this embodiment, the traverser main body T can be stopped while keeping the travel motor 271 rotating, without separately providing a torque limiter or the like on the inverter control of the travel motor 271 or the drive shaft of the travel motor 271.

Even during the occurrence of the above-described slip, the friction between the friction transmission member 275 and the bush 276 and between the friction transmission member 244 and the travel roller 23 is not zero, and friction occurs.

Hence, even during the occurrence of the slip, by friction, a force for rotating in the moving direction (forward direction) of the traverser main body T acts on the travel rollers 22 and 23 between the friction transmission member 275 and the bush 276 and between the friction transmission member 244 and the travel roller 23.

For this reason, the apparent rotation of the travel rollers 22 and 23 stops, but a force for moving forward continuously acts on the travel rollers 22 and 23. Hence, the travel rollers 22 and 23 never rotate in the direction (backward direction) opposite to the moving direction. That is, the travel rollers 22 and 23 (traverser main body T) are anti-back rollers and therefore never move backward. Hence, the traverser main body T continuously stops at the stop position P1 (or P2) where it contacts the stop members 15, and the correct positioning state at the stop position P1 (or P2) is held.

When loading/unloading the conveyance target object W, the traverser main body T and the conveyors 61 and 62 need to be correctly positioned on a millimeter order. Hence, conventionally, a positioning device for the traverser main body is prepared, and the traverser main body T is positioned at a stop position. As the positioning device, a mechanism configured to fix the relative positional relationship between the traverser main body and a conveyor, for example, a butting mechanism, a clamp mechanism, or the like is necessary, resulting in a large-scale apparatus configuration.

On the other hand, in the traverser 100 according to this embodiment, using the travel rollers 22 and 23 that are anti-back rollers, the traverser main body T can be positioned at a correct position only by the configuration of the stop members 15 and the stopper contact portions 29. This obviates the necessity of the positioning device that is conventionally essential.

Also, even if shock absorbers are used as the stop members 15, when the travel rollers 22 and 23 are used, the stopper contact portions 29 continue pressing the shock absorbers against the push back by the springs of the shock absorbers. For this reason, the traverser main body T is stopped while keeping the stopper contact portions 29 in contact with the shock absorbers. Hence, the traverser main body T can correctly be positioned at the stop position P1 (or P2) only by the shock absorbers.

Also, after the position sensor 42 detects that the moving unit 2 reaches the stop position P1 (or P2), the rotation of the travel motor 271 is continued for a predetermined time until loading/unloading of the conveyance target object W ends. When it is confirmed that the conveyance unit 3 is not performing the conveyance operation of transfer of the conveyance target object W, the travel motor 271 may be stopped.

The rotation driving force is transmitted to the travel rollers 22 and 23 by friction transmission. Hence, if the traverser main body T contacts an operator or the like halfway through the movement from the stop position P1 to P2 or from the stop position P2 to P1, and an overload more than the friction transmission force acts, the transmission of the rotation driving force to the travel rollers 22 and 23 is cut off, and the rotation of the travel rollers 22 and 23 stops. Hence, in the traverser 100 according to this embodiment, if an overload more than the friction transmission force acts at the time of movement of the traverser main body T, the traverser main body T can be stopped safely and instantaneously even without providing auxiliary equipment such as a safety fence, a light curtain, or an area sensor.

Second Embodiment

In the above-described embodiment, wired power supply using the cable 13 is used as power supply equipment to the moving unit 2. However, wireless power supply for supplying power from a unit on a power transmission side to a unit on a power reception side in a noncontact (wireless) state may be used.

Figure 14:
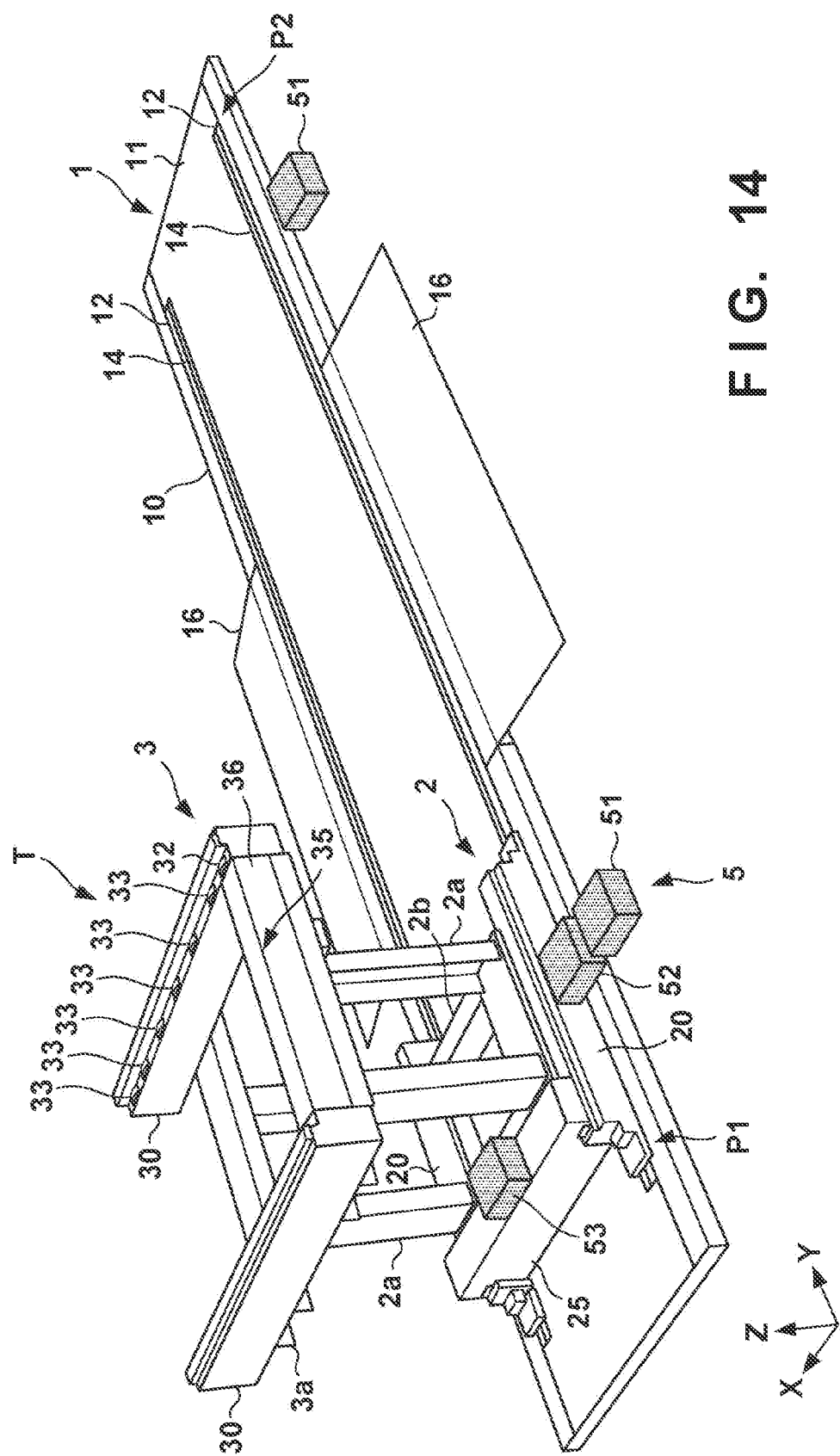
FIG. 14 is a view showing an example of wireless power supply.

FIG. 14 is a view showing an example of a traverser 100 including a wireless power supply device 5. As shown in FIG. 14, the wireless power supply device 5 includes power transmission units 51 provided on a base unit 1, a power reception unit 52 provided on a moving unit 2, and a power storage device 53 such as a battery or a capacitor.

Each power transmission unit 51 is connected to an external electric circuit (for example, a power supply device) (not shown) and arranged such that when a traverser main body T stops at a stop position P1 or a stop position P2, the power transmission unit 51 and the power reception unit 52 are close and face each other (to supply power).

The power reception unit 52 is installed on a side surface of the moving unit 2 and electrically connected to the power storage device 53. This electrical connection can be either wired power supply or wireless power supply. Also, the power storage device 53 may be provided independently of the power reception unit 52 but may be integrated with the power reception unit 52, as a matter of course.

In the wireless power supply device 5, when the traverser main body T stops at the stop position P1 (or P2), the power transmission unit 51 provided at the stop position P1 (or P2) supplies power to the power reception unit 52 by wireless power supply.

The power reception unit 52 stores, in the power storage device 53, the power supplied from the power transmission unit 51. Using the power stored in the power storage device 53, a control circuit 4 drives a travel motor 271.

According to this embodiment, since a configuration associated with a cable 13 is unnecessary, wiring and handling of a cable and the like are unnecessary, and the apparatus configuration becomes simple.

Note that the arrangement of the power reception unit 52, the power transmission unit 51, and the power storage device 53 in FIG. 14 is merely an example, and various arrangements can be employed. For example, only one power transmission unit 51 may be provided. Also, the power transmission unit 51 may be stored in an internal space 10a of the base unit 1.

As the wireless power supply method according to this embodiment, for example, an electromagnetic induction method can suitably be used from the viewpoint of the transfer efficiency and the transmission distance. In addition, any one of a magnetic field resonance method, an electric field coupling method, and a radio wave reception method, which are generally used as a wireless power supply method, can be applied.

Third Embodiment

Figure 16:
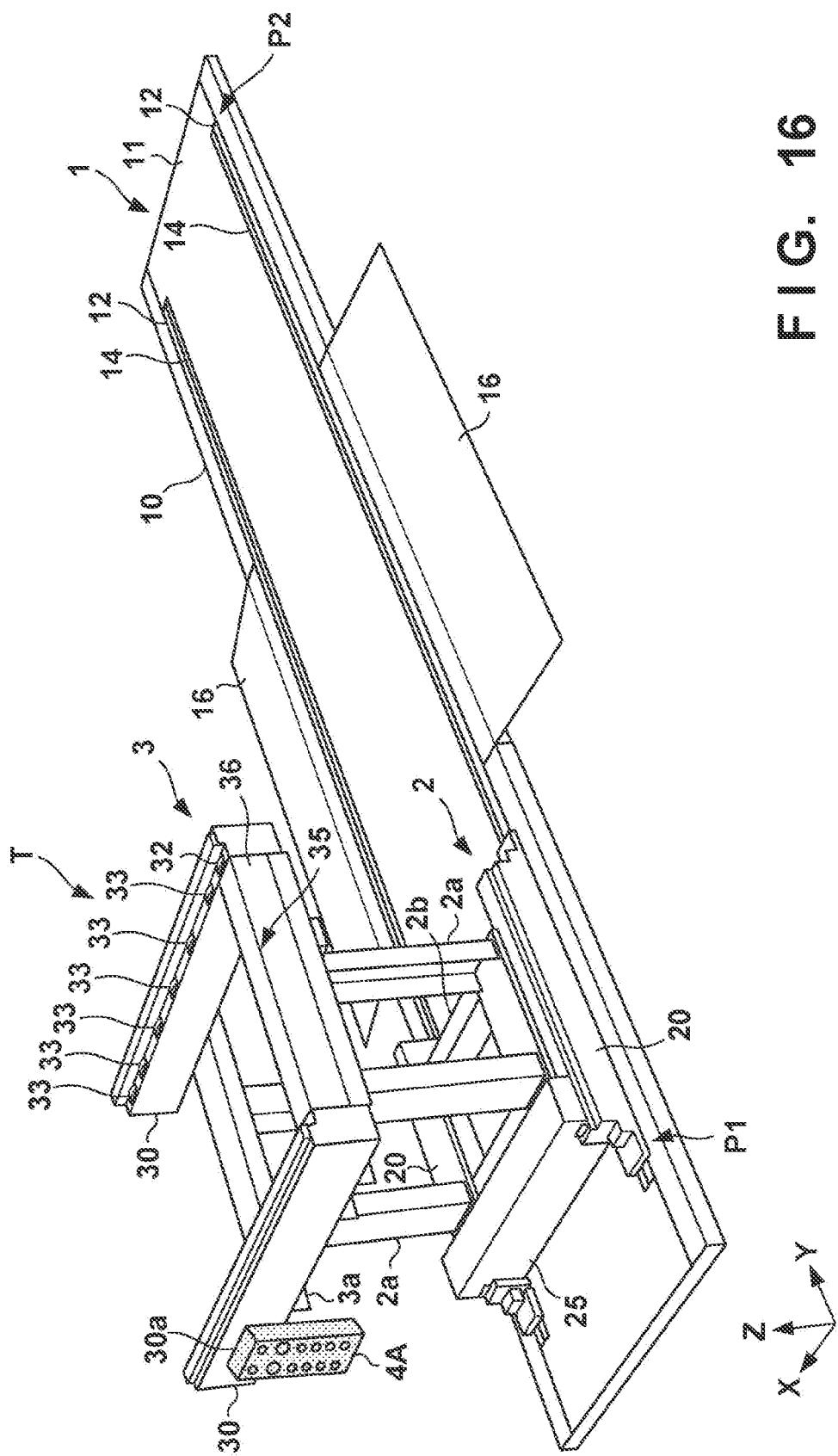
FIG. 16 is a view showing an example of the arrangement of a communication unit.

A control circuit 4 may be arranged outside a moving unit 2. FIG. 16 is a perspective view of a traverser 100 showing as an example, and FIG. 17 is a block diagram of a control system in the example shown in FIG. 16.

In the example shown in FIG. 16, a communication unit 4A is provided as a control unit in place of the control circuit 4. The communication unit 4A includes a display unit 43, and is arranged such that an operator can visually recognize the display unit 43 from outside of the moving unit 2. In the example shown in FIG. 16, the communication unit 4A is fixed to a support portion 30a on the outer wall portion of a conveyance unit 3 and exposed to the outside as a whole. The place to fix the communication unit 4A may be the outer wall portion of the moving unit 2.

The communication unit 4A includes connectors 44 to 46. A communication cable that connects the communication unit 4A and a host device 200 is connected to the connector 44. A power supply cable that connects the communication unit 4A and an external power supply is connected to the connector 45. A control target device such as a travel motor 271 or a rotary encoder 41 is connected to the connector 46.

The communication unit 4A includes, for example, a processor represented by a CPU, a storage device such as a RAM or a ROM, an input/output interface that relays between the control target device and the processor, and a communication interface that performs communication with a host controller. Note that the communication unit 4A may communicate with the host device 200 by wireless communication.

The communication unit 4A receives an instruction from the host device 200 and controls drive of the travel motor 271. Note that the communication unit 4A may also control the conveyance unit 3.

In this embodiment, a detection signal from a position sensor 42 is input to the host device 200 via the communication unit 4A. Based on the detection signal from the position sensor 42, the host device 200 transmits an operation stop instruction or the like to the communication unit 4A. Based on the instruction from the host device 200 and the detection result of the rotary encoder 41, the communication unit 4A controls drive of the travel motor 271.

The display unit 43 performs display concerning control of the travel motor 271. The display unit 43 is formed by a plurality of light-emitting elements. Each light-emitting element is provided, for example, for each connector of the communication unit 4A, and lights during transmission of a control signal from a corresponding connector to the control target device or the host device. Also, each light-emitting element is associated with a type of control signal from the host device 200 and lights during reception of a corresponding control instruction from the host device 200. The operator can confirm the display portion of the display unit 43 and confirm whether the operation of the moving unit 2 or the like is normally being performed.

The invention is not limited to the foregoing embodiments, and various variations/changes are possible within the spirit of the invention.

What is claimed is:

1. A traverser comprising:
    a base unit including a rail member;
    a moving unit configured to reciprocally move on the rail member between a first position and a second position; and
    a conveyance unit mounted on the moving unit and configured to convey a conveyance target object, wherein
    the moving unit comprises:
        a first travel roller that is a drive roller; and
        a drive mechanism configured to give a rotation driving force to the first travel roller,
    the drive mechanism includes:
        a travel motor configured to supply the rotation driving force;
        a friction transmission mechanism configured to transmit the rotation driving force of the travel motor to the first travel roller by a friction force;
        a first drive shaft rotated by the travel motor; and
        a first drive wheel provided at an end portion of the first drive shaft and rotated integrally with the first drive shaft, and
    the friction transmission mechanism comprises
        a first friction transmission member provided on a peripheral surface of the first drive shaft and configured to attach the first travel roller to the first drive shaft.

2. The traverser according to claim 1, wherein
the moving unit comprises:
    a plurality of second travel rollers that are driven rollers; and
    a travel transmission mechanism configured to transmit the rotation driving force of the first travel roller to the plurality of second travel rollers.

3. The traverser according to claim 2, wherein
the travel transmission mechanism comprises:
    a plurality of second drive shafts;
    a second drive wheel provided at an end portion of each of the plurality of second drive shafts;
    a transmitted portion integrally provided in a middle of each of the plurality of second drive shafts;
    a second friction transmission member sandwiched between the second drive wheel and the transmitted portion of each second drive shaft;
    biasing member, provided on each second drive shaft, configured to bias a driving force between the transmitted portion and the second drive wheel; and
    a driving force transmission member configured to transmit the rotation driving force of the first drive wheel to each second drive wheel.

4. The traverser according to claim 2, wherein
the conveyance unit comprises:
- a plurality of conveyance rollers; and
- a conveyance transmission mechanism configured to rotate the plurality of conveyance rollers,
- the conveyance roller is the same roller as the second travel roller, and
- the conveyance transmission mechanism is the same mechanism as the travel transmission mechanism.

5. The traverser according to claim 2, wherein
the moving unit comprises:
- a first roller array formed by arraying the plurality of second travel rollers in a moving direction of the moving unit; and
- a second roller array arranged apart from the first roller array in an orthogonal direction orthogonal to the moving direction and formed by arraying the plurality of second travel rollers along the moving direction,
- the first drive shaft is extended in the orthogonal direction, and
- the first drive wheel is provided at each of one end and the other end of the first drive shaft.

6. The traverser according to claim 5, wherein
the conveyance unit comprises:
- a third roller array formed by arraying the plurality of conveyance rollers in the orthogonal direction orthogonal to the moving direction;
- a fourth roller array arranged apart from the third roller array in the moving direction and formed by arraying the plurality of conveyance rollers along the orthogonal direction;
- a conveyance motor configured to supply the rotation driving force;
- a third drive shaft rotated by the conveyance motor; and
- a third drive wheel provided at each of one end and the other end of the third drive shaft.

7. The traverser according to claim 2, wherein
the base unit comprises:
- a frame body configured to define a storage space for a cable configured to supply power to the travel motor;
- a cover configured to cover the storage space;
- a first stop member configured to contact the moving unit and stop the moving unit at the first position; and
- a second stop member configured to contact the moving unit and stop the moving unit at the second position, the moving unit comprises:
- a control circuit configured to control drive of the travel motor;
- a support body configured to support the travel transmission mechanism; and
- a contact portion supported by the support body and configured to contact a side surface of the rail member during travel of the moving unit, a gap along the rail member is formed between the cover and the rail member,
the travel transmission mechanism and the control circuit are located on an upper side of the cover;
the contact portion is located on a lower side of the cover, and
the support body comprises a support portion configured to support the contact portion via the gap.

8. The traverser according to claim 7, wherein
the base unit comprises first and second cable support portions configured to support the cable, and
the cable is connected to the control circuit via the gap.

9. The traverser according to claim 1, comprising
a wireless power supply device including a power transmission unit provided on the base unit, and a power reception unit provided on the moving unit.

10. A traverser comprising:
a base unit including a rail member;
a moving unit configured to reciprocally move on the rail member between a first position and a second position;
a conveyance unit mounted on the moving unit and configured to convey a conveyance target object;
a rotary encoder configured to detect rotation of the travel motor; and
a control circuit configured to control drive of the travel motor,
wherein
the moving unit comprises:
- a first travel roller that is a drive roller; and
- a drive mechanism configured to give a rotation driving force to the first travel roller, and the drive mechanism includes:
- a travel motor configured to supply the rotation driving force; and
- a friction transmission mechanism configured to transmit the rotation driving force of the travel motor to the first travel roller by a friction force, and the control circuit stops the drive of the travel motor if the moving unit is located at a middle position between the first position and the second position, and an output signal of the rotary encoder does not change for a predetermined time.

11. A traverser comprising:
a base unit including a rail member;
a moving unit configured to reciprocally move on the rail member between a first position and a second position; and
a conveyance unit mounted on the moving unit and configured to convey a conveyance target object,
wherein
the moving unit comprises:
- a first travel roller that is a drive roller;
- a drive mechanism configured to give a rotation driving force to the first travel roller;
- a support body configured to support the travel transmission mechanism; and
- a contact portion supported by the support body and configured to contact a side surface of the rail member during travel of the moving unit, and the drive mechanism includes:
- a travel motor configured to supply the rotation driving force; and
- a friction transmission mechanism configured to transmit the rotation driving force of the travel motor to the first travel roller by a friction force.

12. A traverser comprising:
a base unit including a rail member;
a moving unit configured to reciprocally move on the rail member between a first position and a second position; and
a conveyance unit mounted on the moving unit and configured to convey a conveyance target object,
wherein
the moving unit comprises:
- a first travel roller that is a drive roller; and
- a drive mechanism configured to give a rotation driving force to the first travel roller, the drive mechanism includes:
- a travel motor configured to supply the rotation driving force; and a friction transmission mechanism configured to transmit the rotation driving force of the travel motor to the first travel roller by a friction force, and the base unit comprises:
a frame body configured to define a storage space for a cable configured to supply power to the travel motor;
a cover configured to cover the storage space;
a first stop member configured to contact the moving unit and stop the moving unit at the first position; and
a second stop member configured to contact the moving unit and stop the moving unit at the second position.

13. The traverser according to claim 12, comprising
a passage member installed on a side of the frame body and serving as a step used by an operator to cross the base unit,
wherein the passage member is extended from an installation surface on which the base unit is installed to an upper surface of the rail member.

14. A base unit that constitutes a traverser, the traverser including:
a moving unit configured to reciprocally move on a rail member between a first position and a second position; and a conveyance unit mounted on the moving unit and configured to convey a conveyance target object, the moving unit including: a first travel roller that is a drive roller; and a drive mechanism configured to give a rotation driving force to the first travel roller, the drive mechanism including: a travel motor configured to supply the rotation driving force; and a friction transmission mechanism configured to transmit the rotation driving force of the travel motor to the first travel roller by a friction force,
the base unit comprising:
the rail member;
a frame body configured to define a storage space for a cable configured to supply power to the travel motor;
a cover configured to cover the storage space;
a first stop member configured to contact the moving unit and stop the moving unit at the first position; and
a second stop member configured to contact the moving unit and stop the moving unit at the second position.

15. The base unit according to claim 14, further comprising
a guide device extended in the storage space and configured to support the cable,
wherein one end of the guide device is fixed to the frame body.

16. The base unit according to claim 15, wherein
the guide device is arranged to meander in the storage space, and
the frame body comprises a guide portion configured to guide movement of the guide device.

17. The base unit according to claim 14, comprising
a passage member installed on a side of the frame body and serving as a step used by an operator to cross the base unit,
wherein the passage member is extended from an installation surface on which the base unit is installed to an upper surface of the rail member.

18. A moving unit configured to constitute a traverser, the traverser including:
a base unit including a rail member; and a conveyance unit configured to convey a conveyance target object and reciprocally move, with the conveyance unit mounted, on the rail member between a first position and a second position, the moving unit comprising:
a first travel roller that is a drive roller; and
a drive mechanism configured to give a rotation driving force to the first travel roller,
wherein the drive mechanism includes:
a travel motor configured to supply the rotation driving force;
a friction transmission mechanism configured to transmit the rotation driving force of the travel motor to the first travel roller by a friction force;
a first drive shaft rotated by the travel motor; and
a first drive wheel provided at an end portion of the first drive shaft and rotated integrally with the first drive shaft,
the moving unit comprises:
a support body configured to support the drive mechanism;
a contact portion supported by the support body and configured to contact a side surface of the rail member during travel of the moving unit; and
a conveyance support portion provided on the support body and configured to support the conveyance unit, and
the friction transmission mechanism comprises
a first friction transmission member provided on a peripheral surface of the first drive shaft and configured to attach the first travel roller to the first drive shaft.

19. The moving unit according to claim 18, comprising:
a plurality of second travel rollers that are driven rollers; and
a travel transmission mechanism configured to transmit the rotation driving force of the first travel roller to the plurality of second travel rollers.

20. The moving unit according to claim 19, comprising:
a first roller array formed by arraying the plurality of second travel rollers in a moving direction of the moving unit; and
a second roller array arranged apart from the first roller array in an orthogonal direction orthogonal to the moving direction and formed by arraying the plurality of second travel rollers along the moving direction,
wherein the first drive shaft is extended in the orthogonal direction, and
the first drive wheel is provided at each of one end and the other end of the first drive shaft.

21. A moving unit configured to constitute a traverser, the traverser including:
a base unit including a rail member; and a conveyance unit configured to convey a conveyance target object and reciprocally move, with the conveyance unit mounted, on the rail member between a first position and a second position,
the moving unit comprising:
a first travel roller that is a drive roller;
a drive mechanism configured to give a rotation driving force to the first travel roller; and
a support body configured to support the first travel roller and the drive mechanism,
wherein the drive mechanism includes:
a travel motor configured to supply the rotation driving force;
a friction transmission mechanism configured to transmit the rotation driving force of the travel motor to the first travel roller by a friction force;
a first drive shaft rotated by the travel motor; and a first drive wheel provided at an end portion of the first drive shaft and rotated integrally with the first drive shaft, the support body includes a conveyance support portion configured to support the conveyance unit, and the friction transmission mechanism comprises a first friction transmission member provided on a peripheral surface of the first drive shaft and configured to attach the first travel roller to the first drive shaft.

22. The moving unit according to claim 21, comprising:
a plurality of second travel rollers that are driven rollers; and
a travel transmission mechanism configured to transmit the rotation driving force of the first travel roller to the plurality of second travel rollers.

23. The moving unit according to claim 22, comprising:
a first roller array formed by arraying the plurality of second travel rollers in a moving direction of the moving unit; and
a second roller array arranged apart from the first roller array in an orthogonal direction orthogonal to the moving direction and formed by arraying the plurality of second travel rollers along the moving direction,
wherein the first drive shaft is extended in the orthogonal direction, and
the first drive wheel is provided at each of one end and the other end of the first drive shaft.

24. A moving unit configured to constitute a traverser, the traverser including: a base unit including a rail member; and a conveyance unit configured to convey a conveyance target object and reciprocally move, with the conveyance unit mounted, on the rail member between a first position and a second position, the moving unit comprising:
a first travel roller that is a drive roller;
a drive mechanism configured to give a rotation driving force to the first travel roller;
a support body configured to support the first travel roller and the drive mechanism; and
a communication device configured to receive an instruction from a host device and control drive of the travel motor, wherein the drive mechanism includes:
a travel motor configured to supply the rotation driving force; and
a friction transmission mechanism configured to transmit the rotation driving force of the travel motor to the first travel roller by a friction force, and the support body includes a conveyance support portion configured to support the conveyance unit, and the communication device comprises a display unit configured to perform display concerning control of the travel motor, and is arranged such that the display unit can visually be recognized from outside of the moving unit.

* * * * *